(12) United States Patent
Kagamu

(10) Patent No.: US 12,442,820 B2
(45) Date of Patent: *Oct. 14, 2025

(54) PERIPHERAL BLOOD BIOMARKER FOR EVALUATING ANTI-TUMOR IMMUNE EFFECT OF RADIATION THERAPY

(71) Applicant: Saitama Medical University, Saitama (JP)

(72) Inventor: Hiroshi Kagamu, Saitama (JP)

(73) Assignee: Saitama Medical University, Saitama (JP)

( * ) Notice: Subject to any disclaimer, the term of this patent is extended or adjusted under 35 U.S.C. 154(b) by 1035 days.

This patent is subject to a terminal disclaimer.

(21) Appl. No.: 17/432,744

(22) PCT Filed: Feb. 19, 2020

(86) PCT No.: PCT/JP2020/006616
§ 371 (c)(1),
(2) Date: Aug. 20, 2021

(87) PCT Pub. No.: WO2020/171138
PCT Pub. Date: Aug. 27, 2020

(65) Prior Publication Data
US 2022/0107324 A1   Apr. 7, 2022

(30) Foreign Application Priority Data

Feb. 20, 2019 (JP) .................. 2019-028502
Sep. 26, 2019 (JP) .................. 2019-175852

(51) Int. Cl.
G01N 33/574 (2006.01)
G01N 33/569 (2006.01)

(52) U.S. Cl.
CPC . *G01N 33/57492* (2013.01); *G01N 33/56972* (2013.01); *G01N 2333/70514* (2013.01); *G01N 2333/70517* (2013.01); *G01N 2333/70521* (2013.01); *G01N 2333/70553* (2013.01); *G01N 2333/70564* (2013.01); *G01N 2333/70589* (2013.01)

(58) Field of Classification Search
None
See application file for complete search history.

(56) References Cited

U.S. PATENT DOCUMENTS

| | | | |
|---|---|---|---|
| 6,040,177 A | 3/2000 | Riddell et al. | |
| 11,293,924 B2 | 4/2022 | Kagamu | |
| 2010/0278873 A1 | 11/2010 | Avigan et al. | |
| 2011/0091481 A1 | 4/2011 | Burnette | |
| 2012/0088678 A1 | 4/2012 | Albani | |
| 2015/0297694 A1 | 10/2015 | Kagamu et al. | |
| 2020/0393469 A1 | 12/2020 | Ito et al. | |

FOREIGN PATENT DOCUMENTS

| | | |
|---|---|---|
| CN | 101346463 A | 1/2009 |
| CN | 101801462 A | 8/2010 |
| CN | 103782173 A | 5/2014 |
| CN | 104769431 A | 7/2015 |
| CN | 107106687 A | 8/2017 |
| EP | 1 870 452 A1 | 12/2007 |
| JP | 2015-533796 A | 11/2015 |
| JP | 2017-538664 A | 12/2017 |
| JP | 2018-513172 A | 5/2018 |
| JP | 2018-519327 A | 7/2018 |
| JP | 2018-530747 A | 10/2018 |
| NZ | 569105 A | 7/2011 |
| WO | 2009/012156 A2 | 1/2009 |
| WO | 2009/062001 A1 | 5/2009 |
| WO | 2009/076696 A1 | 6/2009 |
| WO | 2013/006474 A2 | 1/2013 |
| WO | 2014/039983 A1 | 3/2014 |
| WO | 2014/140856 A2 | 9/2014 |
| WO | 2015069770 A1 | 5/2015 |
| WO | 2016/049641 A1 | 3/2016 |
| WO | 2016/054555 A2 | 4/2016 |
| WO | 2016/063263 A2 | 4/2016 |
| WO | 2016/172010 A1 | 10/2016 |
| WO | 2017/004192 A1 | 1/2017 |
| WO | 2017/032867 A1 | 3/2017 |
| WO | 2017/140826 A1 | 8/2017 |
| WO | 2018/140644 A1 | 8/2018 |

(Continued)

OTHER PUBLICATIONS

Kubo et al., Oncology Reports 39: 417-424, 2018 (Year: 2018).*

(Continued)

*Primary Examiner* — Christina M Borgeest
(74) *Attorney, Agent, or Firm* — Seed IP Law Group LLP

(57) ABSTRACT

Provided is a peripheral blood biomarker for evaluating the antitumor immune effect of radiation therapy. Also provided is a method in which the composition of cell subpopulation in a sample obtained from a subject is used as an index for immune activation in the subject caused by a radiation therapy. By comparing, with a reference, the amount of CD4$^+$ T cell subpopulation that correlates with dendritic cell stimulation in an antitumor immune response or the amount of dendritic cell subpopulation that correlates with the dendritic cell stimulation in an antitumor immune response, the presence or absence of, and/or the magnitude of, immune activation occurring in the subject as a result of a radiation therapy can be determined.

18 Claims, 9 Drawing Sheets

(56) References Cited

FOREIGN PATENT DOCUMENTS

| WO | 2018/145023 A1 | 8/2018 |
|---|---|---|
| WO | 2018/147291 A1 | 8/2018 |
| WO | 2018/212237 A1 | 11/2018 |

OTHER PUBLICATIONS

Baixeras et al., "Characterization of the Lymphocyte Activation Gene 3-Encoded Protein. A New Ligand for Human Leukocyte Antigen Class II Antigens," *J. Exp. Med.* 176:327-337, 1992.

Brahmer et al., "Nivolumab versus Docetaxel in Advanced Squamous-Cell Non-Small-Cell Lung Cancer," *N Engl J Med* 373:123-135, 2015.

Cook et al., "Dexamethasone co-medication in cancer patients undergoing chemotherapy causes substantial immunomodulatory effects with implications for chemo-immunotherapy strategies," *OncoImmunology* 5:3, e-1066062, DOI: 10.1080/2162402X.2015. 1066062, 2015, 12 pages.

De Ruysscher et al., "Stimuli: A randomized open-label phase II trial of consolidation with nivolumab and ipilimumab in limited-stage SCLC after standard of care of chemo-radiotherapy conducted by ETOP and IFCT," *Annals of Oncology* 27(6):vi493-vi496, 2016.

Jenkins et al., "Mechanisms of resistance to immune checkpoint inhibitors," *British Journal of Cancer* 118:9-16, 2018.

Kamada et al., "PD-1$^+$ regulatory T cells amplified by PD-1 blockade promote hyperprogression of cancer," *PNAS* 116(20):9999-10008, 2019.

Koyama et al., "Reciprocal CD4$^+$ T-Cell Balance of Effector CD62L$^{low}$ CD4$^+$ and CD62L$^{high}$ CD25$^+$ CD4$^+$ Regulatory T Cells in Small Cell Lung Cancer Reflects Disease Stage," *Clin Cancer Res* 14(21):6770-6779, 2008.

Liu et al., "Potent in vivo anti-tumor activity of isolated CD62L$^{low}$ lymph node cells sensitized in vivo with tumor lysate-pulsed DC-based vaccines," *Cytotherapy* 7(4):353-362, 2005.

Maccalli et al., "Immunological markers and clinical outcome of advanced melanoma patients receiving ipilimumab plus fotemustine in the NIBIT-M1 study," *OncoImmunology* 5(2):e1071007, 2016 (11 pages).

Manjarrez-Orduño et al., "Circulating T Cell Subpopulations Correlate With Immune Responses at the Tumor Site and Clinical Response to PD1 Inhibition in Non-Small Cell Lung Cancer," *Frontiers in Immunology* 9(1613), 2018.

Martens et al., "Baseline Peripheral Blood Biomarkers Associated with Clinical Outcome of Advanced Melanoma Patients Treated with Ipilimumab," *Clin Cancer Res* 22(12):2908-2918, 2016 (12 pages).

Moreno et al., "Response to programmed cell death-1 blockade in a murine melanoma syngeneic model requires costimulation, CD4, and CD8 T cells," *Cancer Immunol Res.* 4(10):845-857, 2016.

O'Mahony et al., "A Pilot Study of CTLA-4 Blockade after Cancer Vaccine Failure in Patients with Advanced Malignancy," *Clin Cancer Res* 13(3):958-964, 2007 (8 pages).

Petrausch et al., "Cancer Immunotherapy: The Role Regulatory T cells Play and What can be Done to Overcome their Inhibitory Effects," *Curr Mol Med.* 9(6):673-682, 2009.

Rosenblatt et al., "CT-011, Anti-PD-1 Antibody, Enhances Ex-Vivo T Cell Responses to Autologous Dendritic/Myeloma Fusion Vaccine Developed for the Treatment of Multiple Myeloma," *Blood* 114(22), 2009, 4 pages.

Shien et al., "Predictive biomarkers of response to PD-1/PD-L1 immune checkpoint inhibitors in non-small cell lung cancer," *Lung Cancer* 99:79-87, 2016 (19 pages).

Sopper et al., "Reduced CD62L Expression on T Cells and Increased Soluble CD62L Levels Predict Molecular Response to Tyrosine Kinase Inhibitor Therapy in Early Chronic-Phase Chronic Myelogenous Leukemia," *Journal of Clinical Oncology* 35(2):175-184, 2016.

Tian et al., "A novel cancer vaccine with the ability to simultaneously produce anti-PD-1 antibody and GM-CSF in cancer cells and enhance TH1-biased antitumor immunity," *Signal Transduction and Targeted Therapy* 1, 16025, 2016, 15 pages.

Vavrova et al., "Generation of T cell effectors using tumor cell-loaded dendritic cells for adoptive T cell therapy," *Med Oncol* 33:136, 2016, 12 pages.

Wang et al., "PD-L1 expression in human cancers and its association with clinical outcomes," *OncoTargets and Therapy* 9:5023-5039, 2016.

Yoshimoto et al., "Special issue, New development of immunotherapy, Combination therapy including immunotherapy, Combination of immunotherapy and radiation therapy," *Journal of Molecular Targeted Therapy for Cancer* 15(2): 164-168, Jul. 2017.

Zimmermann et al., "Tumors Hamper the Immunogenic Competence of CD4$^+$ T Cell-Directed Dendritic Cell Vaccination," *J Immunol* 179:2899-2909, 2007.

Ishikawa et al., "Cytotoxic T lymphocyte-associated antigen 4 inhibition increases the antitumor activity of adoptive T-cell therapy when carried out with naïve rather than differentiated T cells," *Oncology Reports* 33:2545-2552, Jan. 2015.

Kagamu et al., "CD4+ T cells in PBMC to predict the outcome of anti-PD-1 therapy," *Journal of Clinical Oncology* 35(15), 2 pages, May 2017.

Waki et al., "PD-1 expression on peripheral blood T-cell subsets correlates with prognosis in non-small cell lung cancer," *Cancer Sci* 105:1229-1235, 2014.

Kagamu et al., "Purification of L-Selectin$^{low}$ Cells Promotes the Generation of Highly Potent CD4 Antitumor Effector T Lymphocytes," *J Immunol* 160:3444-3452, 1998.

Wang et al., "Adoptive immunotherapy of cancer with polyclonal, 10$^8$-fold hyperexpanded, CD4$^+$ and CD8$^+$ T cells," *Journal of Translational Medicine* 2:41, 2004, 12 pages.

Bonaventura et al., "Cold Tumors: A Therapeutic Challenge for Immunotherapy," *Frontiers in Immunology* 10:168, Feb. 3, 2019. (10 pages).

Brenner, "Long-term survial rates of cancer patients achieved by the end of the 20th century: a period analysis," *Lancet* 360:1131-1135, Oct. 12, 2002. (5 pages).

Ferris et al., "Nivolumab for Recurrent Squamous-Cell Carcinoma of the Head and Neck," *New England Journal of Medicine* 375(19):1856-1867, Nov. 10, 2016 (HHS Public Access Author Manuscript, available in PMC Nov. 10, 2017). (18 pages).

Gyawali et al., "A Comparison of Response Patterns for Progression-Free Survivial and Overall Survival Following Treatment for Cancer With PD-1 Inhibitors," *JAMA Network Open* 1(2):e180416, Jun. 22, 2018. (11 pages).

Harris et al., "Immuno-oncology combinations: raising the tail of survival curve," *Cancer Biology & Medicine* 13(2):171-193, Jun. 2016. (23 pages).

Kagamu et al., "Efficacy of PD-1 blockade therapy and T cell immunity in lung cancer patients," *Immunological Medicine* 43(1):10-15, Jan. 10, 2020. (7 pages).

Kaira et al., "CD4+ T-cell immunity predicts long-lasting antitumor immunity after PD-1 bloackade therapy," *Journal of Clinical Oncology* 37(15 Suppl.):2545, May 26, 2019 [Abstract]. (3 pages).

Merriam-Webster, "Plural," accessed Oct. 9, 2024 at URL=https://www.merriam-webster.com/dictionary/plural. (9 pages).

Naran et al., "Principles of Immunotherapy: Implications for Treatment Strategies in Cancer and Infectious Diseases," *Frontiers in Microbiology* 9:3158, Dec. 21, 2018. (23 pages).

Wei et al., "Distinct Cellular Mechanisms Underlie Anti-CTLA-4 and Anti-PD-1 Checkpoint Blockade," *Cell* 170:1120-1133, Sep. 7, 2017. (32 pages).

Alyea et al., "T-cell-depleted allogeneic bone marrow transplantation followed by donor lymphocyte infusion in patients with multiple myeloma: induction of graft-versus-myeloma effect," *Blood* 96(4):934-939, Aug. 15, 2001. (6 pages).

Carey et al., "Through a Glass Darkly: Advances in understanding Breast Cancer Biology, 2000-2010," Clinical Breat Caner 10(3):188-195, Jun. 2010. (8 pages).

Wang et al., "Adoptive transfer of tumor-primed, in vitro-activated, CD4+ T effector cells (TEs) combined with CD8+ TEs provides

(56) References Cited

OTHER PUBLICATIONS intratumoral TE proliferation and synergistic antitumor response," Blood 109(11):4865-4872, Jun. 1, 2007 [Published online Feb. 6, 2007]. (8 pages).

Yao et al., "Levels of peripheral CD4+FoxP3+ regulatory T cells are negatively associated with clinical response to adoptive immunotherapy of human cancer," Blood 119(24):5688-5696, Jun. 14, 2012. (9 pages).

Zhang et al., "RegulatoryT cells in immune checkpoint blockade antitumor therapy," Molecular Cancer 23(251), 2025 [Published online Nov. 8, 2024]. (22 pages).

Kaira et al., CD4+ T-cell immunity predicts long-lasting antitumor immunity after PD-1 blockade therapy, *Journal of Clinical Oncology*, Meeting Abstract ASCO Annual Meeting 1, 2019, 3 pages.

Zhang et al., "PD-1 blockade augments humoral immunity through ICOS-mediated CD4+ T cell instruction," *International Immunopharmacology* 66:127-138, 2019.

\* cited by examiner

Effect of thoracic radiation therapy on peripheral blood CD4+ T cells

Effect of thoracic radiation therapy on peripheral blood myeloid DCs

Fig. 7
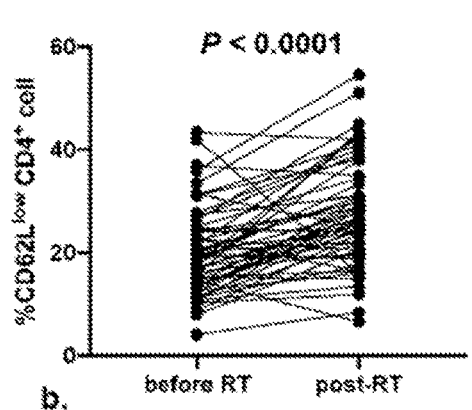
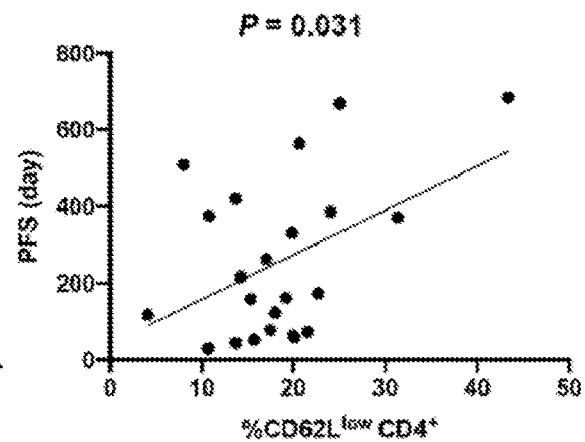
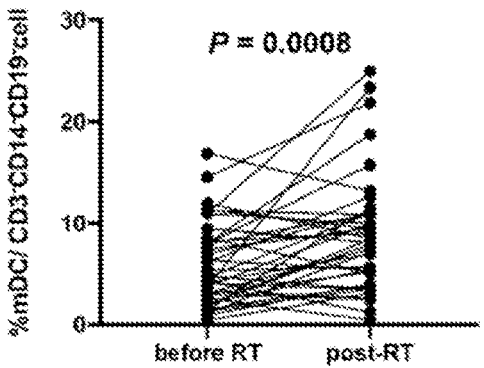
Fig. 8  Immune checkpoint molecule expression on CD62L$^{low}$CD4$^+$ T cell (paired t-test analysis)
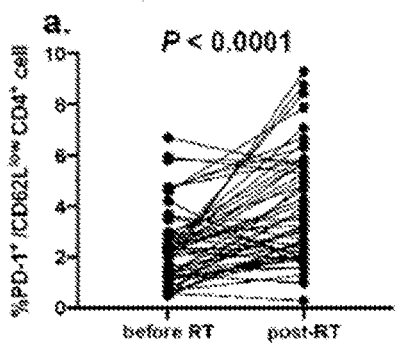
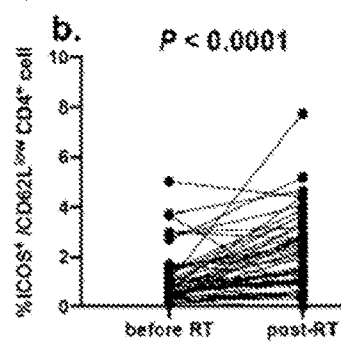
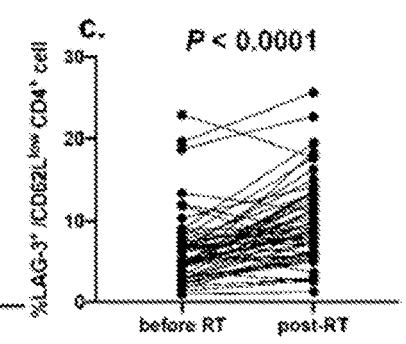

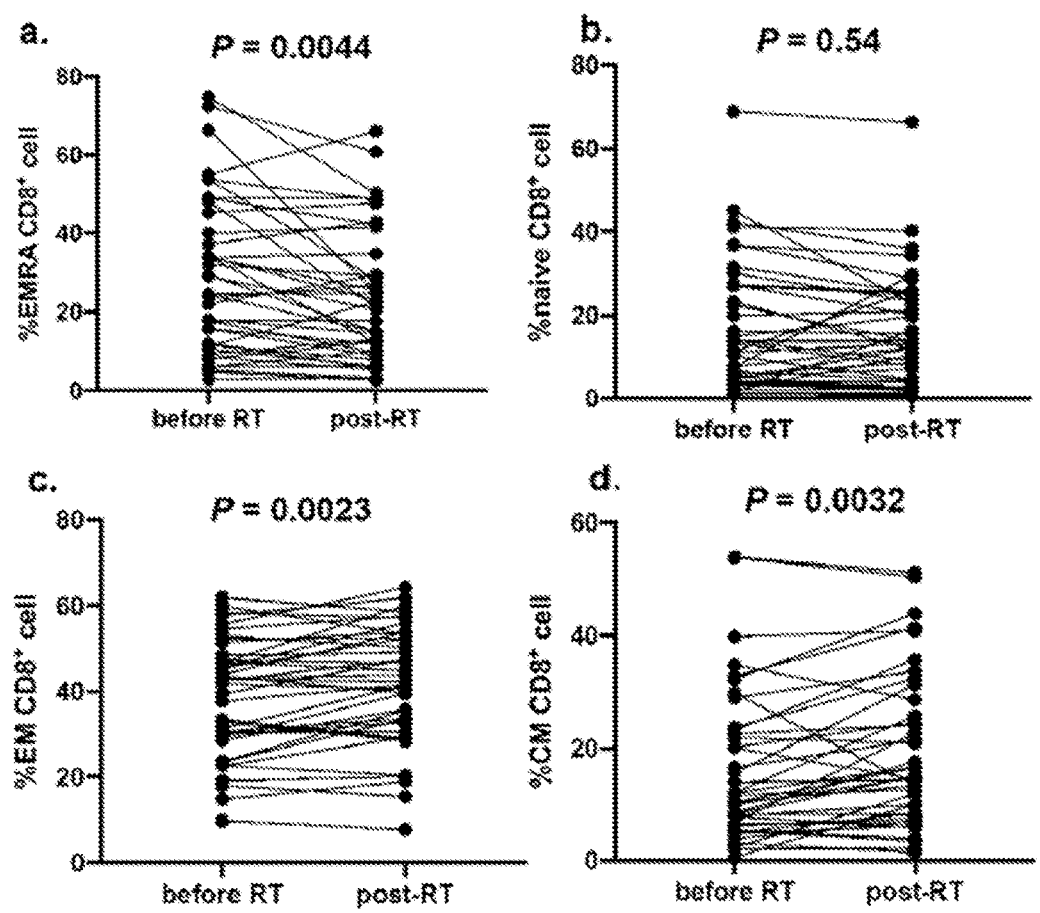

PERIPHERAL BLOOD BIOMARKER FOR EVALUATING ANTI-TUMOR IMMUNE EFFECT OF RADIATION THERAPY

TECHNICAL FIELD

The present invention is associated with the field of cancer therapy. In particularly, the present invention relates to evaluation of the effect of radiation therapy in cancer therapy on immunity.

BACKGROUND ART

An effect of radiation therapy on cancer causing shrinkage of cancer outside of the radiation field has been reported. Such an effect is known as an abscopal effect. While it is understood that an abscopal effect is a phenomenon which is induced through some type of immune activation, much of the detailed mechanism thereof is unknown. A biomarker for quantifying or evaluating a generated abscopal effect has yet to be found.

SUMMARY OF INVENTION

Solution to Problem

The present invention provides a method of using the composition of a cell subpopulation in a sample obtained from a subject as an indicator of radiation therapy-induced immune activation in the subject. The presence/absence and/or degree of radiation therapy-induced immune activation in a subject can be determined by comparing the amount of a specific cell subpopulation described herein with a baseline.

Examples of cell subpopulations that can be used as an indicator in the present invention include, but are not limited to, a CD4$^+$ T cell subpopulation correlated with dendritic cell stimulation in an antitumor immune response, a dendritic cell subpopulation correlated with dendritic cell stimulation in an antitumor immune response, and a CD8$^+$ T cell subpopulation correlated with dendritic cell stimulation in an antitumor immune response. A CD4$^+$ T cell subpopulation correlated with dendritic cell stimulation in an antitumor immune response is, for example, a cell subpopulation within a CD62L$^{low}$CD4$^+$ T cell population (e.g., CD62L$^{low}$CD4$^+$ T cell subpopulation itself, ICOS$^+$CD62L$^{low}$CD4$^+$ T cell subpopulation, or the like). A dendritic cell subpopulation correlated with dendritic cell stimulation in an antitumor immune response is, for example, an HLA-DR$^+$CD141$^+$CD11c$^+$ cell subpopulation or the like. A CD8$^+$ T cell subpopulation correlated with dendritic cell stimulation in an antitumor immune response is, for example, a CD137$^+$CD62L$^{low}$CD8$^+$ T subpopulation or the like.

In another embodiment of the invention, whether cancer immunotherapy should be administered to a subject or when cancer immunotherapy should be administered can be indicated by showing that immunity is activated by radiation therapy in the subject. It is understood that it is advantageous to administer cancer immunotherapy utilizing an immune response against cancer when immunity is activated by radiation therapy, but a biomarker for determining whether immunity is activated by radiation therapy did not exist up to this point.

Preferred cancer immunotherapy includes cancer immunotherapy comprising administration of an immune checkpoint inhibitor. Administration of an immune checkpoint inhibitor can be concomitantly used with other forms of therapy or a different agent (e.g., different immune checkpoint inhibitor).

Examples of embodiments of the inventions are shown in the following items.

(Item 1)
A method of using a composition of a cell subpopulation in a sample obtained from a subject who has undergone radiation therapy as an indicator of radiation therapy-induced immune activation in the subject, comprising:
 analyzing the composition of the cell subpopulation in the sample obtained from the subject;
 wherein the presence/absence of immune activation in the subject is indicated by comparing an amount of a CD4$^+$ T cell subpopulation correlated with dendritic cell stimulation in an antitumor immune response in the sample with a baseline.

(Item 2)
A method of using a composition of a cell subpopulation in a sample obtained from a subject who has undergone radiation therapy as an indicator of radiation therapy-induced immune activation in the subject, comprising:
 analyzing the composition of the cell subpopulation in the sample obtained from the subject;
 wherein the presence/absence of immune activation in the subject is indicated by comparing an amount of a dendritic cell subpopulation correlated with dendritic cell stimulation in an antitumor immune response in the sample with a baseline.

(Item 3)
A method of using a composition of a cell subpopulation in a sample obtained from a subject who has undergone radiation therapy as an indicator of radiation therapy-induced immune activation in the subject, comprising:
 analyzing the composition of the cell subpopulation in the sample obtained from the subject;
 wherein the presence/absence of immune activation in the subject is indicated by comparing an amount of a CD8$^+$ T cell subpopulation correlated with dendritic cell stimulation in an antitumor immune response in the sample with a baseline.

(Item 4)
The method of any of the preceding items, wherein the presence/absence of immune activation in the subject is indicated by comparing at least two amounts selected from the group consisting of an amount of a CD4$^+$ T cell subpopulation correlated with dendritic cell stimulation in an antitumor immune response, an amount of a dendritic cell subpopulation correlated with dendritic cell stimulation in an antitumor immune response, and an amount of a CD8$^+$ T cell subpopulation correlated with dendritic cell stimulation in an antitumor immune response in the sample with a baseline.

(Item 5)
The method of any of the preceding items, wherein the CD4$^+$ T cell subpopulation correlated with dendritic cell stimulation in an antitumor immune response is a cell subpopulation within a CD62L$^{low}$CD4$^+$ T cell population.

(Item 6)
The method of any of the preceding items, wherein the CD4$^+$ T cell subpopulation correlated with dendritic cell stimulation in an antitumor immune response is a CD62L$^{low}$CD4$^+$ T cell subpopulation or a CCR7$^+$CD45RA-CD62L$^{low}$CD4$^+$ T cell subpopulation.

(Item 7)
The method of any of the preceding items, wherein the CD4$^+$ T cell subpopulation correlated with dendritic cell stimulation in an antitumor immune response is an ICOS$^+$ CD62L$^{low}$CD4$^+$ T cell subpopulation, a LAG3$^+$ CD62L$^{low}$CD4$^+$ T cell subpopulation, a PD-1$^+$ CD62L$^{low}$CD4$^+$ T cell subpopulation, or a CD28$^+$ CD62L$^{low}$CD4$^+$ T cell subpopulation.
(Item 8)
The method of any of the preceding items, wherein the dendritic cell subpopulation correlated with dendritic cell stimulation in an antitumor immune response is an HLA-DR$^+$CD141$^+$CD11c$^+$ cell subpopulation.
(Item 9)
The method of any of the preceding items, wherein the CD8$^+$ T cell subpopulation correlated with dendritic cell stimulation in an antitumor immune response is a cell subpopulation within a CD62L$^{low}$CD8$^+$ T cell population.
(Item 10)
The method of any of the preceding items, wherein the CD8$^+$ T cell subpopulation correlated with dendritic cell stimulation in an antitumor immune response is a CD137$^+$ CD62L$^{low}$CD8$^+$ T cell subpopulation.
(Item 11)
The method of any of the preceding items, wherein the sample is a peripheral blood sample.
(Item 12)
The method of any of the preceding items, wherein the baseline is an amount of the cell subpopulation in a sample of the subject prior to the radiation therapy.
(Item 13)
The method of any of the preceding items, wherein an increase in the amount of the cell subpopulation in the sample relative to the baseline indicates that immunity is activated by radiation therapy in the subject.
(Item 14)
The method of any of the preceding items, wherein no increase in the amount of the cell subpopulation in the sample relative to the baseline indicates that immunity is not activated by radiation therapy in the subject.
(Item 15)
The method of any of the preceding items, wherein the radiation therapy is administered within an irradiation range including tumor.
(Item 16)
The method of any of the preceding items, wherein radiation therapy-induced immune activation in the subject further indicates that cancer immunotherapy comprising an immune checkpoint inhibitor should be administered to the subject at that point in time.
(Item 17)
The method of any of the preceding items, wherein no radiation therapy-induced immune activation in the subject further indicates that radiation therapy should be re-administered to the subject.
(Item 18)
The method of any of the preceding items further defined as a method of using a composition of a cell subpopulation in a sample obtained at a plurality of points in time from a subject as an indicator for monitoring radiation therapy-induced immune activation in the subject, the method comprising analyzing the composition of the cell subpopulation in the sample obtained at the plurality of points in time from the subject.
(Item 19)
A composition comprising an immune checkpoint inhibitor for treating cancer in a subject, wherein the composition is administered to a subject who has undergone radiation therapy and is shown to have immunity activated in the subject by the method of any one of the preceding items.

(Item 20)
The composition of the preceding item, wherein the immune checkpoint inhibitor is a PD-1 inhibitor and/or a PD-L1 inhibitor.
(Item 21)
The composition of any of the preceding items, further characterized by being co-administered with one or more additional agents.
(Item 22)
The composition of any of the preceding items, wherein the additional agents comprise a second immune checkpoint inhibitor.
(Item 23)
A product comprising the composition of any of the preceding items and a package insert describing that the composition is concomitantly used with radiation therapy.
(Item 24)
A kit for determining whether immunity is activated by radiation therapy in a subject, comprising a detecting agent for
  (A) CD4 and CD62L;
  (B) (i) a marker selected from ICOS, PD-1, LAG-3, and CD28,
    (ii) CD4, and (iii) CD62L;
  (C) CD11c, CD141, and HLA-DR;
  (D) CD11c, CD123, and HLA-DR; or
  (E) CD8, CD62L, and CD137.
(Item 25)
A composition comprising an immune checkpoint inhibitor for treating cancer, characterized by being administered to a subject who has undergone radiation therapy, wherein the subject had an immune cell composition which was not responsive to cancer immunotherapy before undergoing radiation therapy.
(Item 26)
The composition of the preceding items, wherein the immune cell composition which was not responsive to cancer immunotherapy is an amount or ratio of a CD4$^+$ CD62L$^{low}$ cell subpopulation lower than a threshold value.
(Item 27)
The composition of any of the preceding items, wherein the immune checkpoint inhibitor comprises an anti-PD-1 antibody and/or an anti-PD-L1 antibody.

Advantageous Effects of Invention

The present invention can quantify or evaluate radiation therapy-induced immune activation. This enables monitoring of priming phase activation and effect of increasing effector T cells by radiation therapy over time. Furthermore, the present invention can determine the timing at which immune checkpoint (e.g., PD-1) inhibition therapy should be administered after radiation therapy. The biomarker of the invention can be a biomarker for evaluating the effect of therapy, which causes a change from an immune checkpoint inhibitor ineffective form to an effective form by radiation pseudo-vaccine therapy aimed at a T cell priming effect, and an indicator for selecting a patient in need of treatment for such a change.

BRIEF DESCRIPTION OF DRAWINGS

FIG. 7 is a diagram showing the change in peripheral blood T cell composition as of completion of radiation therapy relative to before radiation therapy. FIG. 7a shows the change in the ratio of a CD62L$^{low}$CD4+ T cell subpopulation in a CD4+ T cell population (P<0.0001, paired t-test). FIG. 7b shows the change in the ratio of an HLA-DR$^{high}$CD11c+CD123− mDC subpopulation (P=0.0008, paired t-test). FIG. 7c shows the correlation between % CD62L$^{low}$CD4+ T cells before therapy and PFS after TRT or CRT in patients who did not undergo durvalumab combination therapy (n=34).

FIG. 8 is a diagram showing the change in the immune checkpoint molecule expression on CD62L$^{low}$CD4+ T cells as of completion of radiation therapy relative to before radiation therapy (paired t-test).

FIG. 11 is a diagram showing the change in T cell subpopulation based on CCR7 and CD45RA gated CD8+ T cells as of completion of radiation therapy relative to before radiation therapy. naive: CCR7+CD45RA+, CM: CCR7+CD45RA−, EM: CCR7−CD45RA−, EMRA: CCR7−CD45RA+ (paired t-test).

DESCRIPTION OF EMBODIMENTS

Figure 1:
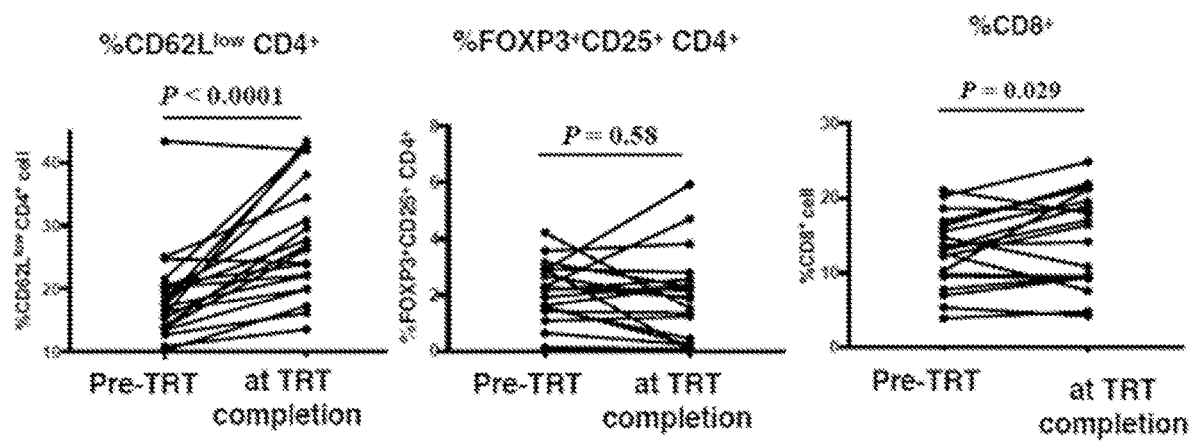
FIG. 1 is a diagram showing a change in peripheral blood T cell composition before thoracic radiation therapy and as of completion of thoracic radiation therapy. The left diagram shows the ratio of a CD62L$^{low}$CD4$^+$ T cell subpopulation in a CD4$^+$ T cell population. The middle diagram shows the ratio of a FOXP3+CD25+CD4+ T cell subpopulation in a CD4+ T cell population. The right diagram shows the ratio of a CD8+ T cell subpopulation in a T cell population. It can be understood that the ratio of the CD62L$^{low}$CD4+ cell subpopulation in the CD4+ cell population increased significantly.

The present invention is described hereinafter while showing the best mode thereof. Throughout the entire specification, a singular expression should be understood as encompassing the concept thereof in the plural form, unless specifically noted otherwise. Thus, singular articles (e.g., "a", "an", "the", and the like in the case of English) should also be understood as encompassing the concept thereof in the plural form, unless specifically noted otherwise. The terms used herein should also be understood as being used in the meaning that is commonly used in the art, unless specifically noted otherwise. Thus, unless defined otherwise, all terminologies and scientific technical terms that are used herein have the same meaning as the general understanding of those skilled in the art to which the present invention pertains. In case of a contradiction, the present specification (including the definitions) takes precedence.

The definitions of the terms and/or the detailed basic technology that are particularly used herein are described hereinafter as appropriate.

Definitions

As used herein, "biomarker" refers to characteristics that can be objectively measured and evaluated as an indicator of a normal biological process, pathological process, or a pharmacological response to therapeutic intervention.

As used herein, "cancer" refers to malignant tumor, which is highly atypic, expands faster than normal cells, and can destructively infiltrate or metastasize surrounding tissue, or the presence thereof. In the present invention, cancer includes, but is not limited solid cancer and hematopoietic tumor.

As used herein, "cancer immunotherapy" refers to a method of treating cancer using a biological defense mechanism such as the immune mechanism of organisms.

As used herein, "antitumor immune response" refers to any immune response against tumor in a live organism.

As used herein, "dendritic cell stimulation in an antitumor immune response" refers to any stimulation that activates dendritic cells, which occurs in the process of an immune response against tumor in a live organism. Such stimulation can be a direct or indirect factor for inducing an antitumor immune response. Although not limited to the following, dendritic cell stimulation in an antitumor immune response can be typically activation of dendritic cells by CD4+ T cells (e.g., effector T cells), resulting in dendritic cells activated thereby stimulating CD8$^+$ T cells, and the stimulated CD8$^+$ T cells exerting an antitumor effect.

As used herein, "correlation" refers to two matters having a statistically significant correlated relationship For example, "relative amount of B correlated with A" refers to the relative amount of B being statistically significantly affected (e.g., increase or decrease) when A occurs.

As used herein, "flow cytometry" refers to a technology of measuring the number of cells, individuals, and other biological particles suspended in a liquid and individual physical/chemical/biological attributes.

As used herein, "immune activation" refers to enhancement in the immune function for eliminating foreign objects in the body. Immune activation can be indicated by an increase in the amount of any factor (e.g., immune cell or cytokine) that has a positive effect on immune function.

As used herein, "cell subpopulation" refers to any group of cells with some type of a common feature in a cell population including cells with diverse properties. For cell subpopulations with a specific name that is known in the art, a specific cell subpopulation can be mentioned by using such a term or by describing any property (e.g., expression of a cell surface marker).

As used herein, the "amount" of a certain cell subpopulation encompasses the absolute number of certain cells and relative amount as a ratio in a cell population. For example, "amount of a CD62L$^{LOW}$CD4$^+$ T cell subpopulation" as used herein may be a relative amount with respect to the amount of CD4$^+$ cells. As used herein, "percentage of cells" refers to the amount of the cell subpopulation. For example, "percentage of CD62L$^{LOW}$CD4$^+$ T cells" refers to the amount of CD62L$^{LOW}$CD4$^+$ T cell subpopulation.

As used herein, the term "relative amount" with regard to cells can be interchangeably used with "ratio". Typically, the terms "relative amount" and "ratio" refer to the number of cells constituting a given cell subpopulation (e.g., CD62L$^{low}$CD4$^+$ T cell subpopulation) with respect to the number of cells constituting a specific cell population (e.g., CD4$^+$ T cell population).

As used herein, "baseline" refers to the amount that is the subject of comparison for determining the increase or decrease in the amount of a marker described herein. When determining the increase/decrease of a certain amount after a certain treatment (e.g., radiation therapy) relative to before the certain treatment, "baseline" can be, for example, said amount before treatment or a value that is commonly considered as a standard in the art.

As used herein, the term "about", when used to qualify a numerical value, is used to mean that the described numerical value encompasses a range of values up to +10%.

As used herein, "radiation" refers to propagation of energy in a space or substance by waveforms or particles.

As used herein, "radiation therapy" refers to any therapeutic method using irradiation of radiation.

(Marker)

An embodiment of the invention provides a method of using a composition of a cell subpopulation in a subject who has undergone radiation therapy as an indicator of radiation therapy-induced immune activation in the subject. The method can comprise analyzing a composition of a cell subpopulation in a sample. The composition of a cell subpopulation can be analyzed by any method described herein or any method that is known to those skilled in the art. The method can be an in vitro or in silico method. One embodiment of the invention indicates the presence/absence of immune activation in a subject by comparing an amount of a cell subpopulation with a suitable baseline. In particular, a cell subpopulation that correlates with dendritic cell stimulation in an antitumor immune response can be used as the cell subpopulation.

In one embodiment, the indicator cell subpopulation is a CD4$^+$ T cell subpopulation correlated with dendritic cell stimulation in an antitumor immune response. For example, in the Examples herein, an increase in the amount of a CD62L$^{low}$CD4$^+$ T cell subpopulation after radiation therapy relative to before radiation therapy is observed. CD62L$^{low}$CD4$^+$ T cells play a role in the activation of dendritic cells in antitumor immunity. It is understood that a CD4$^+$ T cell subpopulation correlated with dendritic cell stimulation in an antitumor immune response can also be used as an indicator of radiation therapy-induced immune activation.

Examples of a CD4$^+$ T cell subpopulation correlated with dendritic cell stimulation in an antitumor immune response include, but are not limited to, a CD4$^+$ T cell subpopulation with decreased expression of a homing molecule to a secondary lymphoid organ, CD4$^+$ T cell subpopulation primed by an effector T cell, CD4$^+$ T cell subpopulation primed by antigen recognition, and regulatory T cell subpopulation.

Examples of a CD4$^+$ T cell subpopulation correlated with dendritic cell stimulation include, but are not limited to, a CD62L$^{low}$CD4$^+$ T cell subpopulation, CCR7$^-$CD4$^+$ T cell subpopulation, LAG-3$^+$CD62L$^{low}$CD4$^+$ T cell subpopulation, ICOS$^+$CD62L$^{low}$CD4$^+$ T cell subpopulation, CCR4$^+$CD25$^+$CD4$^+$ T cell subpopulation, CD45RA$^-$CD4$^+$ T cell subpopulation, CD45RO$^+$CD4$^+$ T cell subpopulation, CD28$^+$CD62L$^{low}$CD4$^+$ T cell subpopulation, CD62L$^{high}$CD25$^+$CD4$^+$ T cell subpopulation, CD127$^+$CD25$^+$CD4$^+$ T cell subpopulation, CD45RA$^-$Foxp3$^+$CD4$^+$ T cell subpopulation, Foxp3$^+$CD25$^+$CD4$^+$ T cell subpopulation, and the like.

A CD4$^+$ T cell subpopulation correlated with dendritic cell stimulation in an antitumor immune response can be, for example, a cell subpopulation within a CD62L$^{low}$CD4$^+$ T cell population. Examples of a CD4$^+$ T cell subpopulation correlated with dendritic cell stimulation in an antitumor immune response include, but are not limited to, CD62L$^{low}$CD4$^+$ T cell subpopulation (i.e., CD62L$^{low}$CD4$^+$ T cell population itself), ICOS$^+$CD4$^+$ T cell subpopulation, ICOS$^+$CD62L$^{low}$CD4$^+$ T cell subpopulation, PD-1$^+$CD4$^+$ T cell subpopulation, PD-1$^+$CD62L$^{low}$CD4$^+$ T cell subpopulation, LAG-3$^+$CD4$^+$ T cell subpopulation, LAG-3$^+$CD62L$^{low}$CD4$^+$ T cell subpopulation, CD28$^+$CD4$^+$ T cell subpopulation, CD28$^+$CD62L$^{low}$CD4$^+$ T cell subpopulation, and the like.

In one embodiment, a CD4$^+$ T cell subpopulation correlated with dendritic cell stimulation in an antitumor immune response (preferably a cell subpopulation within a CD62L$^{low}$CD4$^+$ T cell population) can be an indicator of Progression Free Survival (PFS).

For the cell subpopulations described above, the amount of expression of a suitable surface marker molecule in a suitable cell can be used as an indicator instead of, or in addition to, the amount of the cell subpopulation. For example, the amount of expression of ICOS, PD-1, LAG-3, CD28, or the like expressed in a CD4$^+$ T cell can be used as an indicator. More preferably, the amount of expression of ICOS, PD-1, LAG-3, CD28, or the like expressed in a CD62L$^{low}$CD4$^+$ T cell can be used as an indicator.

In one embodiment, an indicator cell subpopulation is a dendritic cell subpopulation correlated with dendritic cell stimulation in an antitumor immune response. For example, in an embodiment herein, an increase in an HLA-DR$^+$ CD141$^+$CD11c$^+$ cell subpopulation after radiation therapy relative to before radiation therapy is observed. HLA-DR mediates activation of dendritic cells by a CD4$^+$ T cell. It is understood that a dendritic cell subpopulation correlated with dendritic cell stimulation in an antitumor immune response can also be used as an indicator of radiation therapy-induced immune activation. A cell population of CD11c$^+$CD141$^+$CD123$^-$ is generally considered myeloid dendritic cell (mDC, DC that is important for antitumor immunity) with a functionally high Th1 induction capability. Meanwhile, CD141 and CD123 are generally exclusively expressed. Thus, it should be noted that CD141$^+$CD11c$^+$ and CD123$^-$CD11c$^+$ specify the same cell population herein.

Examples of a dendritic cell subpopulation correlated with dendritic cell stimulation in an antitumor immune response include, but are not limited to, a dendritic cell subpopulation that increases due to an increase in a cell subpopulation with decreased expression of a homing molecule in a CD4$^+$ T cell population, dendritic cell subpopulation that increases due to an increase in a CD4$^+$ T cell subpopulation primed by an effector T cell in a CD4$^+$ T cell population, and dendritic cell subpopulation that increases due to an increase in a CD4$^+$ T cell subpopulation primed by antigen recognition in a CD4$^+$ T cell population. Examples of dendritic cell subpopulations include, but are not limited to, HLA-DR$^+$ dendritic cell subpopulations, CD80$^+$ dendritic cell subpopulations, CD86$^+$ dendritic cell subpopulations, and PD-L1$^+$ dendritic cell subpopulations. Examples of dendritic cells include, but are not limited to, myeloid dendritic cells (mDC, CD141$^+$CD11c$^+$ dendritic cells) and plasmacytoid dendritic cells (pDC, CD123$^+$CD11c$^+$ dendritic cells).

Examples of a dendritic cell subpopulation correlated with dendritic cell stimulation in an antitumor immune response include an HLA-DR$^+$CD141$^+$CD11c$^+$ cell subpopulation. For the cell subpopulation described above, an amount of expression of a suitable surface marker molecule in a suitable cell can be used as an indicator instead of, or in addition to, the amount of the cell subpopulation. For example, the amount of expression of HLA-DR or the like expressed in a CD141$^+$CD11c$^+$ can be used as an indicator.

In one embodiment, an indicator cell subpopulation is a CD8$^+$ T cell subpopulation correlated with dendritic cell stimulation in an antitumor immune response. For example, CD137 expressed on a CD62L$^{low}$CD8$^+$ T cell changes after radiation therapy relative to before radiation therapy with a significant difference (Table 4). Dendritic cells which have been activated by CD4$^+$ T cells stimulate CD8$^+$ T cells, and stimulated CD8$^+$ T cells ultimately exert antitumor activity. CD137 on a CD8$^+$ T cell mediates stimulation of a CD8$^+$ T cell by a dendritic cell. It is understood that a CD8$^+$ T cell subpopulation correlated with dendritic cell stimulation in an antitumor immune response can also be utilized as an indicator of radiation therapy-induced immune activation.

Examples of a CD8$^+$ T cell subpopulation correlated with dendritic cell stimulation in an antitumor immune response include, but are not limited to, a CD8$^+$ T cell subpopulation that increases due to an increase in a cell subpopulation with decreased expression of a homing molecule in a CD4$^+$ T cell population, CD8$^+$ T cell subpopulation that increases due to an increase in a CD4$^+$ T cell subpopulation primed by an effector T cell in a CD4$^+$ T cell population, CD8$^+$ T cell subpopulation that increases due to an increase in a CD4$^+$ T cell subpopulation primed by antigen recognition in a CD4$^+$ T cell population, CD8$^+$ T cell subpopulation that increases due to an increase in an HLA-DR$^+$ dendritic cell subpopulation in a dendritic cell population, CD8$^+$ T cell subpopulation that increases due to an increase in a CD80$^+$ dendritic cell subpopulation in a dendritic cell population, and CD8$^+$ T cell subpopulation that increases due to an increase in a PD-L1$^+$ dendritic cell subpopulation in a dendritic cell population. Furthermore, examples of CD8$^+$ T cell subpopulations correlated with dendritic cell stimulation in an antitumor immune response include, but are not limited to, CD62L$^{low}$CD8$^+$ T cell subpopulation, CD137$^+$CD8$^+$ T cell subpopulation, and CD28$^+$CD62L$^{low}$CD8$^+$ T cell subpopulation.

Examples of a CD8$^+$ T cell subpopulation correlated with dendritic cell stimulation in an antitumor immune response include a CD137$^+$CD62L$^{low}$CD8$^+$ T cell subpopulation. For the cell subpopulation described above, an amount of expression of a suitable surface marker molecule in a suitable cell can be used as an indicator instead of, or in addition to, the amount of the cell subpopulation. For example, the amount of expression of CD137, PD-1, CD28, or the like expressed in a CD62L$^{low}$CD8$^+$ T cell can be used as an indicator.

A significant change is observed after radiation therapy relative to before radiation therapy for myeloid-derived suppressor cells (MDSC, CD33$^+$CD14$^+$HLA-DR-cell population). Thus, the ratio of such a cell population can also be an indicator.

The amount of cell subpopulation described herein can be used as an indicator by combining a plurality of amounts. Combining indicators can improve the accuracy of prediction of responsiveness. One embodiment can indicate the presence/absence of immune activation in a subject by comparing at least two amounts selected from the group consisting of an amount of a CD4$^+$ T cell subpopulation correlated with dendritic cell stimulation in an antitumor immune response, an amount of a dendritic cell subpopulation correlated with dendritic cell stimulation in an antitumor immune response, and an amount of a CD8$^+$ T cell subpopulation correlated with dendritic cell stimulation in an antitumor immune response in a sample with a baseline. For example, in one embodiment, an index of $X^2/Y$, which combines the ratio of CD62L$^{low}$ cells in CD4$^+$ T cells in a sample (X) with the ratio of CD25$^+$FoxP3$^+$ in CD4$^+$ T cells (Y), can be used. Those skilled in the art understand that an additional indicator which can indicate radiation therapy-induced immune activation can be further used instead of, or in addition to, these indicators. In the present invention, the amount of a cell subpopulation within a given cell subpopulation can be used instead of or in addition to the amount of the given cell subpopulation.

For examples, in view of the results shown in the Examples herein, the following factors can be used as a marker. When the ratio of a cell subpopulation is expressed in a form of % 00/00 herein, CD62L$^{low}$/CD4$^+$ T cells, for example, means the ratio of CD62L$^{low}$CD4$^+$ T cells to CD4$^+$ T cells, wherein the cells described in the numerator comprises all of the features of the cells described in the denominator. When the denominator for the cell subpopulation is not explicitly described, the ratios to any cell population including said cell subpopulation, such as a CD4$^+$ T cell population or CD8$^+$ T cell population, can be encompassed.

Examples of factors that increase immediately after completion of radiation therapy (RT) among factors that are understood to change significantly by RT and associated with T cell immunity boost include:

% CD62L$^{low}$/CD4$^+$ T cells (the ratio of CD62L$^{low}$CD4$^+$ T cells to CD4$^+$ T cells);

% LAG3$^+$/CD62L$^{low}$CD4$^+$ T cells (can be LAG3$^+$/effector memory (CCR7$^-$CD45RA$^-$) CD4$^+$ T cells);

% ICOS$^+$/CD62L$^{low}$CD4$^+$ T cells (can be % ICOS$^+$/effector memory (CCR7$^-$CD45RA$^-$) CD4$^+$ T cells);

% CD28$^+$/CD62L$^{low}$CD4$^+$ T cells (can be % CD28$^+$/effector memory (CCR7$^-$CD45RA$^-$) CD4$^+$ T cells); and % HLA-DR+/CD11c$^+$CD141$^+$ cells (HLA-DR$^{high}$CD11c$^+$CD123$^-$ mDC, can be % mDC/CD3-CD14-CD19-cells)

% PD-1$^+$/CD62L$^{low}$CD4$^+$ T cells

% CD62L$^{low}$CCR7$^+$CD45RA-/CD4$^+$ T cells (can be CCR7$^+$CD45RA$^-$CD4$^+$ cells)

% CCR7$^-$CD45RA$^-$CD4$^+$ T cells

% CCR7$^-$CD45RA$^-$CD8$^+$ T cells (EM CD8$^+$ T cells)

% CCR7$^+$CD45RA$^-$CD8$^+$ T cells (CM CD8$^+$ T cells).

Examples of factors that decrease immediately after completion of RT include:

% CCR7$^+$CD45RA$^+$CD4$^+$ cells (naïve CD4$^+$ T cells) and

% CCR7$^-$CD45RA$^+$CD8$^+$ T cells (EMRA CD8$^+$ T cells).

Examples of factors that increase until one month after completion of RT include:

% PD-1$^+$/CD62L$^{low}$CD4$^+$ T cells (can be % PD-1$^+$/effector memory (CCR7$^-$CD45RA$^-$) CD4$^+$ T cells);

% CD137$^+$/CD62L$^{low}$CD4$^+$ T cells (can be % CD137$^+$/effector memory (CCR7$^-$CD45RA$^-$) CD4$^+$ T cells);

% PD-1$^+$/CD62L$^{low}$CD8$^+$ T cells (can be % PD-1$^+$/effector (CCR7$^+$CD45RA$^-$) CD8$^+$ T cells or % PD-1$^+$/effector memory (CCR7$^-$CD45RA$^-$) CD8$^+$ T cells); and % CD137$^+$/CD62L$^{low}$CD8$^+$ T cells (can be % CD137$^+$/effector (CCR7$^+$CD45RA$^-$) CD8$^+$ T cells or % CD137$^+$/effector memory (CCR7$^-$CD45RA$^-$) CD8$^+$ T cells).

Factors understood to be significantly increased by radiation therapy and associated with T cell immune suppression include:

% CD25$^+$FoxP3$^+$/CD4$^+$ T cells (regulatory T cells); and

% CD33$^+$CD14$^+$HLA-DR$^{low}$ cells (Myeloid-derived suppressors (MDSC)). Although not wishing to be bound by any theory, they are understood to be negative feedback that suppresses activated cell-mediated immunity. It is understood that they are useful as a factor for evaluating the immunological state after radiation therapy.

The present invention can determine the presence/absence of immune activation in a subject by comparing the amount of a cell subpopulation with a suitable baseline. An increase in the amount of a cell subpopulation in a sample relative to a baseline can indicate radiation therapy-induced immune activation in a subject. Alternatively, no increase in the amount of a cell subpopulation in a sample relative to a baseline can indicate no radiation therapy-induced immune activation in a subject.

Examples of a baseline include, but are not limited to, the corresponding amount of cell subpopulation in a sample of a subject before radiation therapy. As the baseline, a value experimentally computed from a sample of a subject who has not undergone radiation therapy or the like can also be used. For example, a value statistically computed by regression analysis or the like based on data obtained from a plurality of samples of subjects can be used as the baseline. A baseline can be calculated by machine learning, artificial intelligence, or the like from data obtained from a subject.

An increase relative to a baseline can be indicated by an amount of cell subpopulation after radiation therapy, which is an amount exceeding the baseline, an amount that is 1, 2, 3, 4, 5, 10, 15, 20, or 30% beyond the baseline, or an amount that is more than 1.5-fold, 2-fold, 3-fold, or 5-fold of the baseline. Typically, the amount is considered to be increased relative to the baseline if the amount exceeds the baseline value. When the baseline is experimentally computed, the amount can be considered to be increased relative to the baseline if an increase exceeding a suitable error relative to the baseline value is observed. Examples of suitable errors include 1 standard deviation, 2 standard deviations, 3 standard deviations, and greater errors.

(Fractionation/Separation of Cells)

A sample for fractionation/separation of T cells can be suitably collected from a subject using a conventional method. For example, such a sample can be collected from peripheral blood, bone marrow, tumor tissue, hematopoietic tissue, spleen, normal tissue, lymph, or the like of a subject. Sample collection from peripheral blood can be advantageous for being simple and non-invasive.

The composition of T cells in a sample of a subject can be measured by those skilled in the art using a conventional method. Generally, the number of cells that are positive for a marker (e.g., CD4) defining a cell subpopulation of interest in a sample can be measured using flow cytometry or the like. The measurement of the composition of a cell population generally uses flow cytometry, but other means may be used, such as a method using an antibody array or immunostaining on a sample comprising cells, protein expression analysis in a sample comprising cells (e.g., Western blot, mass spectrometry, HPLC, or the like), or mRNA expression analysis in a sample comprising cells (microarray, next generation sequencing, or the like).

To measure the cell count in each cell subpopulation such as CD62L$^{low}$CD4$^+$ T cell subpopulation, the cell count may be found by experimentally removing cells other than each cell subpopulation from all cells. There is a kit for the materialization thereof. For example, cells corresponding to a CD4$^+$CD62L$^{low}$ T cell subpopulation can be separated from peripheral blood without using a CD4 antibody or CD62L antibody by using a CD4$^+$Effector Memory T cell isolation kit, human (Militenyi Biotech). This is achieved by counting and recording the total viable cell count, and counting and recording the number of cells obtained using this kit.

An antibody does not need to be used. Antibodies that can specifically recognize and bind a molecule expressed on individual cells are prepared so that they can emit color when bound to a molecule expressed on the cell surface or in cells. The antibodies are then detected to measure the number of cells that are emitting color. Since these molecules expressed on the cell surface or in the cells are proteins, mRNA encoding a protein when the protein is expressed is also formed in the cells. In other words, it is sufficient to examine mRNA in individual cells to examine the presence/absence of mRNA encoding a protein molecule of interest. This is made possible by single cell gene expression analysis, i.e., mRNA analysis at a single cell level. Examples of single cell gene expression analysis include 1) a method of next generation sequencing using Quartz-Seq, 2) a method of isolating cells using a Fluidigm C1 System or ICELL8 Single-Cell System to prepare a library with SMART-Seq v4, 3) a method of separating cells with a cell sorter and measuring the cells by quantitative PCR using an Ambion Single Cell-to-CT kit, 4) CyTOF SYSTEM (Helios), and the like.

Blood is obtained, viable cells are counted, and cells are separated with a cell sorter or the like. For example, Ambion Single Cell-to-CT kit can be used on the individual separated cells to measure the expression level of a specific gene with an apparatus for quantitative PCR. Based on the result, individual cells are examined as to which subpopulation such as the CD62L$^{low}$ CD4$^+$ T cell subpopulation the cells fall under to count the number of cells falling under each subpopulation. Examples of candidate genes whose expression is examined include αβTCR, CD3, CD4, CD25, CTLA4, GITR, FoxP3, STAT5, Fox01, Fox03, IL-10, TGF-beta, IL-35, SMAD2, SMAD3, SMAD4, CD62Llow, CD44, IL-7R (CD127), IL-15R, CCR7low, BLIMP1, and the like.

Examples of genes with elevated expression in CD62L$^{low}$CD4$^+$ T cells than in CD62L$^{high}$CD4$^+$ T cells include AURAKA, CCL17, CD101, CD24, FOXF1, GZMA, GZMH, IL18RAP, IL21, IL5RA, ND2, SMAD5, SMAD7, and VEGFA (WO 2018/147291, which is incorporated herein by reference in its entirety for any purpose). Expression of these genes can be studied to determine which T cell subpopulation the obtained T cells belong to and measure the amount and/or ratio of the cell subpopulation.

Examples of genes with elevated expression in CD62L$^{high}$CD4$^+$ T cells than in CD62L$^{low}$CD4$^+$ T cells include BACH2, CCL28, CCR7, CD27, CD28, CD62L, CSNKID, FOXP1, FOXP3, IGF1R, IL16, IL27RA, IL6R, LEF1, MAL, and TCF7 (WO 2018/147291). Expression of these genes can be studied to determine which T cell subpopulation the obtained T cells belong to and measure the amount and/or ratio of the cell subpopulation.

Measurement of the ratio of cell subpopulations or comparison with a threshold value in the present invention may use a reference sample with a defined signal. Signals can be compared between a reference (e.g., particle to which a fluorescent pigment is attached) prepared to induce a fluorescent signal corresponding to a given cell subpopulation and a sample comprising a cell population to measure the amount or ratio of a cell subpopulation in the sample by comparison with a reference. Signals can also be compared between a reference (e.g., particle to which a fluorescent pigment is attached) prepared to induce a fluorescent signal corresponding to a predetermined threshold value and a sample comprising a cell population to determine the presence/absence or the amount of the marker of the invention in the T cell composition in the sample by comparison with a reference.

When determining a specific marker to be high (high expression) or low (low expression) in the present invention, those skilled in the art can use a classification baseline for expression intensity that is commonly used in the art. For example, it is possible to clearly divide CD62L into CD62L$^{low}$ and CD62L$^{high}$ using the signal intensity corresponding to a 10E2 signal when using a PE-labeled anti-human CD62L antibody as the boundary (WO 2018/147291).

(Radiation Therapy)

An embodiment of the invention provides an indicator of radiation therapy-induced immune activation. In radiation therapy, irradiation of radiation can disrupt DNA or RNA of cancer cells to suppress cell division and/or induce apoptosis (cell death) to reduce cancer cells. Generally, radiation dose up to the maximum tolerance dose for normal cells (about 50 to 60 Gy) is divided (about 2 Gy per day) and irradiated onto tissue. While normal cells repair the disruption in genes and survive, cell death is induced in cancer cells with slower self-repairing action than normal cells from being irradiated with radiation again before the disrupted genes are repaired such that the genes cannot be repaired. This materializes tumor regression in the radiation field.

It is reported that tumor regression is induced outside of the radiation field in addition to tumor regression within the radiation field from radiation therapy. This is known as an abscopal effect. Tumor regression outside of the radiation field cannot be explained by suppression of proliferation/death of cancer cells due to radiation described above. This was understood as some type of an effect mediated by activation of the immune system, but much of the detailed mechanism is unknown. While it is understood that efficacy of cancer immunotherapy utilizing antitumor immunity can be improved by activation of the immune system by radiation therapy, a biomarker for confirming whether an abscopal effect is generated in a subject who has undergone radiation therapy had not been found. A biomarker indicating immune activation (abscopal effect) that affects the outside of the radiation field in a subject who has undergone radiation therapy is provided herein.

Radiation is roughly classified into electromagnetic waves and particle beams. Electromagnetic waves include X-rays, γ-rays, and the like. Particle beams are material particles that flow with high kinetic energy. Examples thereof include α-ray, β-ray, neutron beam, proton beam, heavy ion beam, meson beam, and the like.

Methods of irradiating radiation in radiation therapy are divided into "external irradiation" that applies radiation from the outside of the body and "internal irradiation" that applies radiation on cancer or the periphery thereof from the inside of the body. External irradiation and internal irradiation can also be combined.

External irradiation irradiates radiation through the skin from the outside of the body. A method of irradiating high energy X-rays is the most common. External irradiation includes various modes, including, but not limited to, X-ray irradiation by a LINAC (linear accelerator), three-dimensional conformal radiation therapy (3D-CRT), intensity-modulated radiation therapy (IMRT), stereotactic radiation therapy (SRT), particle beam therapy (proton beam therapy/heavy particle beam therapy), image-guided radiation therapy (IGRT), and the like).

Examples of internal irradiation modes include, but are not limited to, brachytherapy (internal radiation and intracavitary radiation), therapy using unsealed radioisotopes (internal therapy), and the like.

The mode of radiation therapy that can be within the scope of the invention is not limited, as long as radiation is irradiated in a mode that can result in immune activation. For example, the radiation field in radiation therapy can be an irradiation range including tumor tissue. Although not wishing to be bound by any theory, it is understood that tumor cells subjected to radiation therapy resulting in immunogenic cell death is important for increasing antitumor effector T cells. Examples of radiation therapy include thoracic irradiation, irradiation onto bone metastasis site, irradiation onto lymph node metastasis, irradiation onto adrenal metastasis, irradiation onto liver metastasis, irradiation onto brain metastasis, and the like.

The biomarker of the invention can be utilized for planning a schedule for radiation therapy that is intended to activate immunity. For example, no radiation therapy-induced immune activation in a subject can indicate that radiation therapy should be re-administered to a subject. Alternatively, radiation therapy-induced immune activation in a subject can indicate that radiation therapy should be discontinued.

Radiation therapy can irradiate a dose of about 1 to 3 Gy per administration about 1 to 2 times a day over 3 to 8 weeks. However, if concomitant use of small doses of multiple administrations of irradiation with cancer immunotherapy is considered, immune cells (e.g., T cells) can also be affected, so that hypofractionated radiation therapy (e.g., a small number of large doses are irradiated in 1 to 2 weeks) can be preferable.

To reduce the possibility of a side effect from radiation therapy, further radiation therapy can be withheld when it is indicated that immunity is activated. It is advantageous to activate immunity without unnecessary irradiation, especially when the dose per administration is high. In the past, it was not possible to monitor when immunity is activated, so that radiation therapy was administered in accordance with a schedule that has been empirically determined in advance. With the biomarker of the invention, a suitable timing for discontinuing radiation therapy can be determined.

(Cancer Immunotherapy)

Cancer immunotherapy is a method of treating cancer using a biological defense mechanism of an organism. Cancer immunotherapy can be largely divided into cancer immunotherapy from strengthening the immune function against cancer and cancer immunotherapy from inhibiting the immune evasion mechanism of cancer. Cancer immunotherapy further includes active immunotherapy for activating the immune function in the body and passive immunotherapy for returning immune cells with an immune function activated or the numbers thereof expanded outside the body into the body. A suitable timing for cancer immunotherapy utilizing the immune function can be found from the biomarker of the invention indicating radiation therapy-induced immune activation.

Examples of cancer immunotherapy include non-specific immunopotentiators, cytokine therapy, cancer vaccine therapy, dendritic cell therapy, adoptive immunotherapy, non-specific lymphocyte therapy, cancer antigen specific T cell therapy, antibody therapy, immune checkpoint inhibition therapy, and the like.

PD-1 inhibitors are representative examples of immune checkpoint inhibitors. Examples of PD-1 inhibitors include, but are not limited to, anti-PD-1 antibody nivolumab (sold as Opdivo™), pembrolizumab, spartalizumab, and cemiplimab. In one preferred embodiment, nivolumab can be selected.

PD-L1 inhibitors and PD-1 inhibitors can be used in the same manner in the present invention. It is understood that anti-PD-1 antibodies achieve an anticancer effect by releasing the suppression of T cell activation by a PD-1 signal. It is understood that anti-PD-L1 antibodies also achieve an anticancer effect by releasing the suppression of T cell activation by a PD-1 signal. While the mechanism of PD-1 inhibiting a T cell function is not fully elucidated, it is understood that an interaction between PD-1 (programmed death 1) and PD-L1 or PD-L2 recruits a tyrosine phosphatase, SHP-1 or 2, to the cytoplasmic domain of PD-1 to inactivate a T cell receptor signaling protein ZAP70, thus suppressing activation of T cells (Okazaki, T., Chikuma, S., Iwai, Y. et al.: A rheostat for immune responses: the unique properties of PD-1 and their advantages for clinical application. Nat. Immunol., 14, 1212-1218 (2013)). This is understood to be due to recruitment of SHP-1 or 2 to a part known as an ITSM motif which dephosphorylates proximal signaling kinase of a T cell receptor in the vicinity. In other words, the memory of "being stimulated by an antigen" is erased from a T cell that has been stimulated by an antigen.

PD-1 is expressed at a high level in killer T cells and natural killer cells, which have infiltrated into a cancer tissue. It is understood that an immune response mediated by a PD-1 signal from PD-1 is attenuated by PD-L1 on tumor. While the immune response mediated by a PD-1 signal is attenuated by PD-L1, an effect of enhancing an antitumor immune response is attained by inhibiting an interaction between PD-1 and PD-L1 and/or signaling induced by an interaction by an anti-PD-1 antibody.

PD-L1 inhibitors (e.g., anti-PD-L1 antibodies avelumab, durvalumab, and atezolizumab) are other examples of an immune checkpoint inhibitor.

PD-L1 inhibitors bind to and inhibit the aforementioned PD-1 pathway on the PD-L1 side to inhibit an interaction between PD-1 and PD-L1 and/or signaling induced by an interaction to induce an antitumor immune response.

CTLA-4 inhibitors (e.g., anti-CTLA-4 antibodies ipilimumab and tremelimumab) are other examples of an immune checkpoint inhibitor. CTLA-4 inhibitors activate T cells to induce an antitumor immune response. T cells are activated by an interaction of CD28 on the surface with CD80 or CD86. However, it is understood that surface expressed CTLA-4 (cytotoxic T-lymphocyte-associated antigen 4) preferentially interacts with CD80 or CD86 with higher affinity than CD20 to suppress activation, even for T cells that have been activated. CTLA-4 inhibitors induce an antitumor immune response by inhibiting CTLA-4 to prevent inhibition of an interaction between CD20 and CD80 or CD86.

In another embodiment, an immune checkpoint inhibitor may target an immune checkpoint protein such as TIM-3 (T cell immunoglobulin and mucin containing protein-3), LAG-3 (lymphocyte activation gene-3), B7-H3, B7-H4, B7-H5 (VISTA), or TIGIT (T cell immunoreceptor with Ig and ITIM domain).

It is understood that the immune checkpoints described above suppress an immune response to autologous tissue, but immune checkpoints increase in T cells when an antigen such as a virus is present in vivo for an extended period of time. It is understood that for tumor tissue, it is also an antigen which is present in vivo for an extended period of time, so that an antitumor immune response is evaded by such immune checkpoints. The aforementioned immune checkpoint inhibitors invalidate such an evasion function to achieve an antitumor effect.

In the present invention, an immune checkpoint inhibitor can be appropriately used in combination with another cancer therapy. Examples of another cancer therapy include, but are not limited to, radiation therapy as well as other cancer immunotherapy (e.g., adoptive cell transfer), chemotherapy, hyperthermia therapy, surgical procedure, and the like. An immune checkpoint inhibitor can be co-administered with one or more additional agents. One or more additional agents can be any chemotherapeutic drug, or a second immune checkpoint inhibitor can be included.

One embodiment of the invention provides a composition comprising an immune checkpoint inhibitor. The composition comprising an immune checkpoint inhibitor of the invention is generally administered systemically or locally in an oral or parenteral form. It is understood that a significant therapeutic effect can be attained by administering the composition comprising an immune checkpoint inhibitor of the invention by the method described herein to a subject indicated to have radiation therapy-induced immune activation.

The dosage varies depending on the age, body weight, symptom, therapeutic effect, administration method, treatment time, or the like, but is generally administered, for example, orally one to several times a day in the range of 0.1 mg to 100 mg per dose per adult, or is administered parenterally (preferably intravenously) one to several times a day in the range of 0.01 mg to 30 mg per dose per adult, or is continuously administered intravenously in the range of 1 hour to 24 hours per day. Of course, the dosage varies depending on various conditions, so that an amount less than the dosage described above may be sufficient or an amount exceeding the range may be required.

For administration, a composition comprising an immune checkpoint inhibitor can have a dosage form such as a solid agent or liquid agent for oral administration or an injection, topical agent, or suppository for parenteral administration. Examples of solid agents for oral administration include tablets, pills, capsules, powder, granules, and the like. Capsules include hard and soft capsules.

The composition of the invention is one or more active ingredients (e.g., antibody to an immune checkpoint protein) that is directly used or is mixed with an excipient (lactose, mannitol, glucose, microcrystalline cellulose, starch, etc.), binding agent (hydroxypropyl cellulose, polyvinyl pyrrolidone, magnesium aluminometasilicate, etc.), disintegrant (calcium cellulose glycolate, etc.), lubricant (magnesium stearate, etc.), stabilizer, solubilizing agent (glutamic acid, aspartic acid, etc.), or the like as needed, which is formulated in accordance with a conventional method for use. The composition may also be coated with a coating agent (refined sugar, gelatin, hydroxypropyl cellulose, hydroxypropyl methyl cellulose phthalate, or the like) or coated by two or more layers as needed. Capsules made of a substance that can be absorbed such as gelatin are also encompassed.

The composition of the invention comprises a pharmaceutically acceptable aqueous agent, suspension, emulsion, syrup, elixir, or the like when formulated as a liquid agent for oral administration. In such a liquid agent, one or more active ingredients is dissolved, suspended, or emulsified in a commonly used diluent (purified water, ethanol, a mixture thereof, or the like). Such a liquid agent may also contain a humectant, suspending agent, emulsifier, sweetener, flavor, fragrance, preservative, buffer, or the like.

Examples of injections for parenteral administration include a solution, suspension, emulsion, and solid injection that is used by dissolving or suspending it in a solvent at the time of use. An injection is used by dissolving, suspending, or emulsifying one or more active ingredients into a solvent. Examples of solvents that are used include distilled water for injections, saline, vegetable oil, propylene glycol, polyethylene glycol, alcohols such as ethanol, combination thereof, and the like. Such an injection may also comprise a stabilizer, solubilizing agent (glutamic aspartic acid, acid, polysorbate 80™, or the like), suspending agent, emulsifier, analgesic, buffer, preservative, or the like. They are prepared by sterilizing or aseptic operation in the final step. It is also possible to manufacture an aseptic solid agent such as a lyophilized product, which is sterilized or dissolved in aseptic distilled water for injection or another solvent before use.

The composition of the invention can be housed in a box or the like with a package insert describing that the composition is concomitantly used with radiation therapy as a product. A package insert can describe that the composition of the invention is desirably administered within a predetermined period after radiation therapy. A package insert can explicitly instruct concomitant use with radiation therapy or simply mention the possibility of concomitant use.

(Cancer)

Examples of target cancer in the present invention include, but are not limited to, melanoma (malignant melanoma), non-small cell lung cancer, renal cell cancer, malignant lymphoma (Hodgkin's or non-Hodgkin's lymphoma), head and neck cancer, urological cancer (bladder cancer, urothelial cancer, and prostate cancer), small cell lung cancer, thymic carcinoma, gastric cancer, esophageal cancer, esophagogastric junction cancer, liver cancer (hepatocellular carcinoma and intrahepatic cholangiocarcinoma), primary brain tumor (glioblastoma and primary central nervous system lymphoma), malignant pleural mesothelioma, gynecologic cancer (ovarian cancer, cervical cancer, and uterine cancer), soft tissue sarcoma, cholangiocarcinoma, multiple myeloma, breast cancer, colon cancer, and the like.

(Therapeutic Method Concomitantly Using Radiation Therapy and Immunotherapy)

Radiation therapy can be administered to a subject, and a sample can be collected from the subject who underwent radiation therapy. The presence/absence of radiation therapy-induced immune activation in a subject can be determined as described herein by analyzing the composition of a cell subpopulation in the sample. A sample can be collected from a subject before undergoing radiation therapy as needed. The composition of a cell subpopulation in the sample can be used as a baseline for comparison.

The timing of sample collection is not particularly limited. Whether immunity is activated by radiation therapy and how long immune activation persists vary by subject. A sample can be collected at any point in time to study the immune activation at the time. A change in a cell subpopulation such as changes in HLA-DR positive rate of dendritic cells (CD11c$^+$CD141$^+$ cells) and ICOS positive rate of CD62L$^{low}$CD4$^+$ T cells may persist for 2 to 3 months in some cases. A high percentage of CD62L$^{low}$CD4$^+$ T cells may persist for one year or more depending on the subject. The post-chemoradiotherapy Durvalumab (anti-PD-L1 antibody) administrable period covered by insurance is specified as a period from day one after completion of chemoradiotherapy to when disease is not progressing. It is understood that a post-radiation therapy change in the immune activation state can be detected to determine whether to administer cancer immunotherapy during such a period.

The peak of a change in dendritic cell or T cell subpopulations is at immediately after completion of radiation therapy. It is shown that the ratio of a subpopulation such as the percentage of CD62L$^{low}$CD4$^+$ T cells subsequently tends to revert to the original ratio. For this reason, while not required, the possibility of detecting immune activation for administrating cancer immunotherapy can be improved by obtaining a sample before a certain period has passed from the point in time of radiation therapy. For example, a sample can be obtained within about one year, within about 6 months, within about 3 months, within about 2 months, within about 4 weeks, or within about 14 day from the time of radiation therapy, or immediately after radiation therapy, but the timing is not limited thereto.

When radiation therapy is administered over a certain period, radiation therapy-induced immune activation in a subject can be monitored by obtaining a sample from the subject at a plurality of points in time. If, for example, immunity is not activated by radiation therapy, radiation therapy can be re-administered to a subject. If immunity is activated by radiation therapy, radiation therapy can be discontinued to administer cancer immunotherapy. The plurality of points in time can be after each irradiation of radiation, after one of several (e.g., 2, 3, 4, 5, or more) irradiations of radiation, or once every several days (e.g., 2 days, 3 days, 4 days, 5 days, 1 week, 2 weeks, or more) independently of irradiation.

When immune activation is indicated by the biomarker of the invention, cancer immunotherapy can be administered to a subject. The timing of administering cancer immunotherapy is not particularly limited, as long as the immune activation is maintained. Since there is a possibility that immune activation reverts to the original state with passage of time from radiation therapy, although not required, cancer immunotherapy can be administered to a subject within a certain period after radiation therapy such as within about 4 weeks after radiation therapy or about 14 days after radiation therapy when immune activation is indicated. This can increase the possibility of benefiting from an abscopal effect. In one embodiment, when immunity is activated by radiation therapy in a subject, cancer immunotherapy comprising an immune checkpoint inhibitor can be administered to the subject at the time.

In one embodiment, the timing of administering cancer immunotherapy can be determined by further using a factor that contributes to immune suppression. For example, if the timing is about one month after radiation therapy, regulatory T cells or MDSCs may increase, so that cancer immunotherapy immune inhibitor be comprising an checkpoint can administered to a subject before an increase in such a cell subpopulation (i.e., when the ratio of said cell subpopulation is at or below a certain ratio).

The inventors found that the amount or ratio of a specific cell subpopulation (e.g., a $CD4^+$ T cell subpopulation correlated with dendritic cell stimulation in an antitumor immune response, dendritic cell subpopulation correlated with dendritic cell stimulation in an antitumor immune response, or $CD8^+$ T cell subpopulation correlated with dendritic cell stimulation in an antitumor immune response) included in immune cells in a subject changes by radiation therapy. In view of the above, one aspect of the invention provides regulation of the ratio of a cell subpopulation in a subject by administration of radiation therapy to a subject. In particular, the amount or ratio of a cell subpopulation (e.g., $CD4^+CD62L^{low}$ cell subpopulation) within a $CD4^+CD62L^{low}$ cell population can be increased by radiation therapy. It is understood that a specific cell subpopulation (e.g., $CD4^+CD62L^{low}$ cell subpopulation) in a subject plays a role in antitumor immunity in the subject. Since the amount or ratio of such a specific cell subpopulation playing a role in antitumor immunity can be changed by radiation therapy, it is understood that a subject can be changed to a state that is responsive to cancer immunotherapy (e.g., immune checkpoint inhibitor) by radiation therapy.

One embodiment of the invention provides a method of treating cancer in a subject with an immune cell composition (e.g., low amount or ratio of $CD4^+CD62L^{low}$ cell subpopulation) that is not responsive to cancer immunotherapy, comprising administering radiation therapy to the subject. This method comprises administering cancer immunotherapy to the subject as needed. This method can also comprise measuring immune cell composition in the subject. This enables cancer immunotherapy to be administered after confirming that the subject changed to a state that is responsive to cancer immunotherapy by radiation therapy. The present invention also provides a composition comprising an immune checkpoint inhibitor for treating cancer, characterized by being administered to a subject who has undergone radiation therapy and has an immune cell composition (e.g., low amount or ratio of $CD4^+CD62L^{low}$ cell subpopulation) unresponsive to cancer immunotherapy. The immune cell composition can be, for example, immune cell composition in peripheral blood.

The immune cell composition which is not responsive (or responsive) to cancer immunotherapy can be determined by those skilled in the art by referring to WO 2018/147291 or the like. For example, the immune cell composition is understood to be unresponsive to cancer immunotherapy if the ratio of $CD62L^{low}$ T cells in $CD4^+$ T cells is lower than a threshold value (non-responder group threshold value). A threshold value can be appropriately determined by those skilled in the art while considering sensitivity/specificity. Examples of threshold values for the percentage of $CD62L^{low}CD4^+$ include 19.4%. The immune cell composition can also be determined using a relative value of the percentage of $CD62L^{low}CD4^+$ to regulatory T cells (e.g., percentage of $CD25^+Foxp3^+CD4^+$ cells). For example, X/Y or $X^2$/Y can be used, wherein X is the percentage of $CD62L^{low}CD4^+$ and Y is the percentage of $CD25^+Foxp3^+CD4^+$ cells. For example, 7.35 can be the threshold value for the ratio (X/Y) and 192 can be the threshold value for $X^2$/Y in such a case.

(Kit)

One embodiment of the invention provides a kit for determining whether immunity is activated by radiation therapy in a subject. A kit can comprise one or more detecting agents for a suitable molecule for detecting a cell subpopulation described herein. Such a combination of detecting agents can be used to determine the T cell composition of a subject. Such a kit can be used for measuring the ratio of a specific cell subpopulation as a novel biomarker described herein in a subject.

In one embodiment of the invention, a kit can comprise a detecting agent for (A) CD4 and CD62L;
(B) (i) a marker selected from ICOS, PD-1, LAG-3, and CD28,
(ii) CD4, and (iii) CD62L;
(C) CD11c, CD141, and HLA-DR;
(D) CD11c, CD123, and HLA-DR; or
(E) CD8, CD62L, and CD137. In one embodiment, the detecting agent is an antibody. Preferably, an antibody facilitates detection of a suitably labeled marker.

EXAMPLES

Example 1: Indicator of Radiation Therapy-Induced Immune Activation (Summary)

This Example demonstrates that the composition of a specific cell subpopulation in a subject is a parameter (i.e., biomarker) that significant changes in the subject after radiation therapy relative to before radiation therapy.

(Materials and Methods)

[Subject]

In this Example, peripheral blood was collected before and after radiation therapy (also at a later date when applicable) to study the composition of cell populations within the peripheral blood for the following subjects (20 subjects).

TABLE 1

| Patient number | Dose | Frequency | Objective | Treatment type | Sampling before treatment | Sampling after treatment | Sampling after treatment (later date) |
|---|---|---|---|---|---|---|---|
| 1 | 60 | 30 | curative | CRT | −41 | 0 | N/A |
| 2 | 60 | 30 | curative | CRT | −42 | 0 | 32 |
| 3 | 60 | 30 | curative | CRT | −50 | 0 | 35 |
| 4 | 60 | 30 | curative | CRT | −55 | 0 | 49 |
| 5 | 60 | 30 | curative | CRT | −45 | 0 | 15 |
| 6 | 60 | 30 | curative | CRT | −44 | 0 | 31 |
| 7 | 60 | 30 | curative | CRT | −46 | 1 | 18 |
| 8 | 60 | 30 | curative | TRT | −42 | 18 | N/A |
| 9 | 66 | 33 | curative | TRT | −48 | 0 | N/A |
| 10 | 60 | 30 | curative | TRT | −52 | 0 | 21 |
| 11 | 60 | 30 | curative | TRT | −44 | 0 | N/A |
| 12 | 66 | 33 | curative | TRT | −50 | 6 | N/A |
| 13 | 66 | 33 | curative | TRT | −48 | −2 | N/A |
| 14 | 50 | 25 | curative | TRT | −40 | −2 | 16 |
| 15 | 30 | 10 | palliative | SVC | −26 | 0 | N/A |
| 16 | 30 | 10 | palliative |  | −13 | 2 | N/A |
| 17 | 30 | 10 | palliative |  | −16 | 5 | N/A |
| 18 | 50 | 5 | curative | SRT | −50 | 9 | 44 |
| 19 | 50 | 5 | curative | SRT | −28 | 0 | 40 |
| 20 | 54 | 3 | curative | SRT | −4 | 13 | 39 |

Timing of sampling indicates, for before treatment, how many days before start of radiation therapy and, for after treatment, how many days after completion of treatment.

CRT: chemoradiotherapy, TRT thoracic radiotherapy, SVC: superior vena cava, SRT: stereotactic radiotherapy, curative: curative, palliative: palliative

[PBMC Analysis]

Sampling at each point in time and PBMC analysis were performed as follows. A BD Vacutainer CPT™ blood collecting tube for mononuclear cell separation was used for PBMC analysis. PBMC was subjected to FCM analysis.

TABLE 2

| 1 | Blood collection (7-8 mL) | BD/Vacutainer spitz (containing heparin) |
|---|---|---|
| 2 | Centrifugation | Centrifugation condition: 3200 rpm 20 minutes<br>Treatment condition: room temperature (18-25° C.)<br>*Within 2 hours after blood collection |
| 3 | Plasma collection | 2 ml of plasma is collected from a single bottle so as not to stir cell components immediately above the gel barrier. 2 mL each was dispensed into a 2.0 mL cryogenic vial (external thread, round bottom) and stored at −80° C. |
| 4 | Cell component collection | After collecting plasma, plasma component and cell component remaining on the top layer of gel barrier are stirred and collected by pipetting |
| 5 | Centrifugation | Centrifugation condition: 1600 rpm, 5 minutes<br>Treatment condition: 4° C. |
| 6 | Cell count | |
| 7 | Centrifugation | Centrifugation condition: 1600 rpm, 5 minutes<br>Treatment condition: 4° C.<br>TakaraBio/CELLBANKER 2<br>Cells are suspended in CELLBANKER 2 solution so that the concentration would be 5 million cells/mL |
| 8 | Cryopreservation | Cells suspended in CELLBANKER 2 were dispensed in a cryogenic vial and frozen in a −80° C. deep freezer in a BiCell (container for programmed freezing)<br>Stored in a liquid nitrogen tank within a week |

During Analysis

1. Myeloid Cell Analysis

After thawing, cells were subjected to antibody staining for CD11c, CD141, HLA-DR, CD33, CD14, and the like, and flow cytometry analysis was performed.

2. T Cell Analysis

1) Cells were suspended in RPMI 1640+10% FCS and were left standing for about 36 hours (32 to 48 hours) in a 5% $CO_2$ incubator at 37° C.

2) The cells were subjected to antibody staining for a T cell surface marker, and flow cytometry analysis was performed.

(Results)

The t-statistic was computed for the ratio of each cell population before and after radiation therapy in 20 subjects by paired two-sided Student's t-test. The results are shown in the following Table 3. Results with a t-statistic of 0.05 or less are bolded and underlined.

TABLE 3

| | | | | |
|---|---|---|---|---|
| CD8 | | % CD8 | | 0.08527 |
| | | | % $CD62L^{low}$ | 0.45145 |
| | | % CD4 | | 0.25839 |
| | CD4 | | % $CD62L^{low}$ | 0.00005 |
| | | | % $CD25^+FoxP3^+$ | 0.79704 |
| | | | $X^2/Y^*$ | 0.00684 |
| CD4 | | $CD62L^{low}$ | % $PD1^+$ | 0.09589 |

TABLE 3-continued

Figure 3:
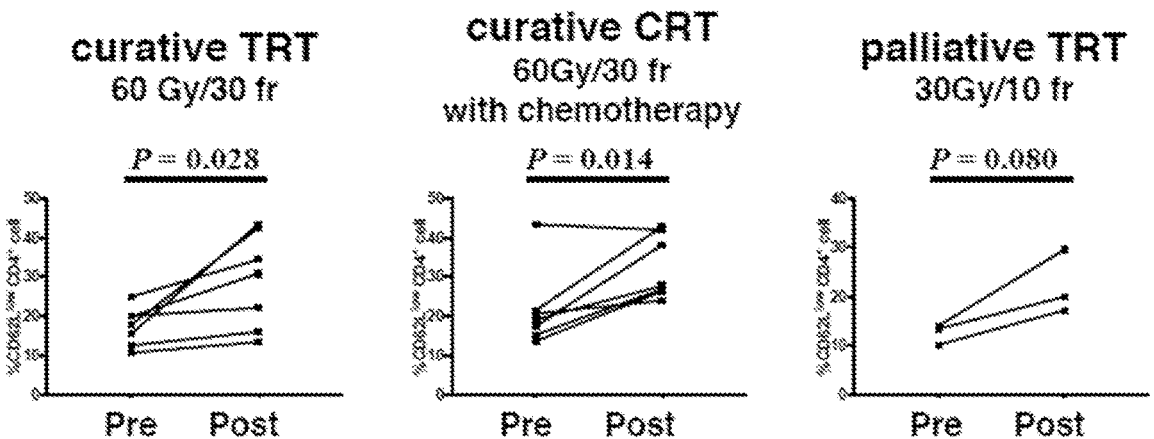
FIG. 3 is a diagram showing the change in the ratio of a CD62L$^{low}$CD4+ cell subpopulation in a CD4+ cell population for several types of therapy. It can be understood that the ratio of the CD62L$^{low}$CD4+ cell subpopulation in the CD4+ cell population has an increasing trend due to radiation therapy for any type of therapy, i.e., curative TRT: curative thoracic radiation therapy, curative CRT: curative chemoradiotherapy, and palliative TRT: palliative thoracic radiation therapy.
Figure 4:
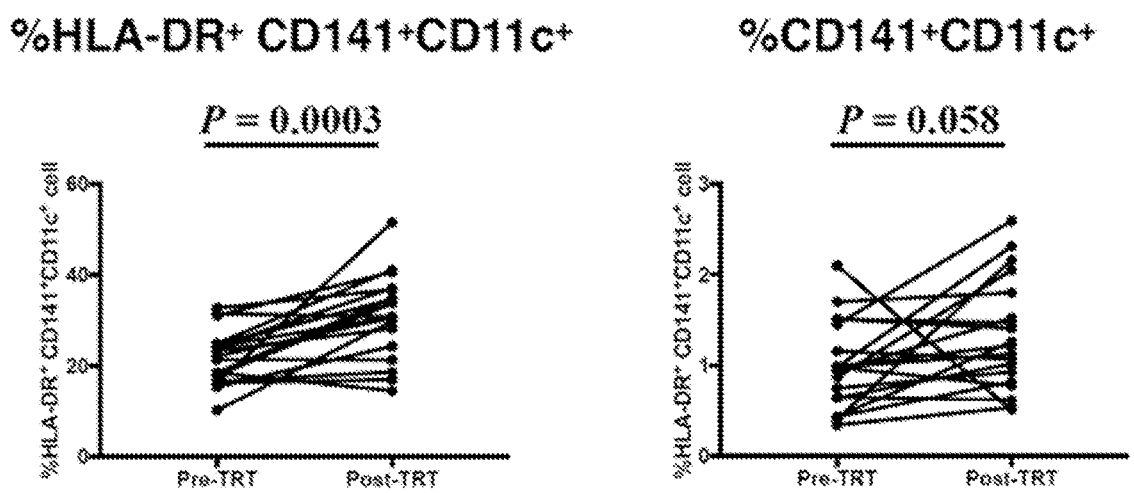
FIG. 4 is a diagram showing the change in peripheral myeloid DC composition after thoracic radiation therapy relative to before thoracic radiation therapy. The left diagram shows the ratio of an HLA-DR+CD141+CD11c+ cell subpopulation in a CD141+CD11c+ cell population. The right diagram shows the ratio of a CD141+CD11c+ cell subpopulation in a PBMC population. It is understood that the ratio of the HLA-DR+CD141+CD11c+ cell subpopulation in the CD141+CD11c+ cell population increased significantly.

| | | | |
|---|---|---|---|
| | $CD62L^{high}$ | | 0.34327 |
| | $CD62L^{low}$ | % LAG3+ | 0.00269 |
| | $CD62L^{high}$ | | 0.04940 |
| | $CD62L^{low}$ | % ICOS+ | 0.00847 |
| | $CD62L^{high}$ | | 0.02795 |
| | $CD62L^{low}$ | % CD28+ | 0.05066 |
| | $CD62L^{high}$ | | 0.13572 |
| | $CD62L^{low}$ | % CD137+ | 0.11265 |
| | $CD62L^{high}$ | | 0.45483 |
| CD8 | $CD62L^{low}$ | % PD1+ | 0.45717 |
| | $CD62L^{high}$ | | 0.30724 |
| | $CD62L^{low}$ | % CD137+ | 0.07432 | racic radiation therapy, curative CRT: curative chemoradiotherapy, and palliative TRT: palliative thoracic radiation therapy) (FIG. 3). The ratio of an HLA-DR+CD141+CD11c+ cell subpopulation in a CD141+CD11c+ cell population increased significantly after radiation therapy relative to before radiation therapy (FIG. 4).

The t-statistic was computed for the difference in the ratios of each cell population before radiation therapy, as of completion of radiation therapy, and after radiation therapy for subjects (n=11) sampled three times by paired two-sided Student's t-test. The results are shown in the following Table 4. Results with a t-statistic of 0.05 or less are bolded and underlined.

TABLE 4

| | | | | 1 vs 2 | 2 vs 3 | 1 vs 3 |
|---|---|---|---|---|---|---|
| | | | % CD8 | 0.27048 | 0.33391 | 0.83945 |
| | CD8 | | % $CD62L^{low}$ | 0.76510 | 0.40857 | 0.51159 |
| | | | % CD4 | 0.00406 | 0.02730 | 0.73208 |
| | CD4 | | % $CD62L^{low}$ | 0.00309 | 0.03705 | 0.05926 |
| | | | % CD25+FoxP3+ | 0.60905 | 0.01533 | 0.03230 |
| | | | $X^2/Y$ | 0.03160 | 0.04496 | 0.51546 |
| CD4 | | $CD62L^{low}$ | % PD1+ | 0.11156 | 0.04637 | 0.00212 |
| | | $CD62L^{high}$ | | 0.68432 | 0.87268 | 0.90077 |
| | | $CD62L^{low}$ | % LAG3+ | 0.11500 | 0.43324 | 0.05044 |
| | | $CD62L^{high}$ | | 0.18017 | 0.30969 | 0.36390 |
| | | $CD62L^{low}$ | % ICOS+ | 0.09817 | 0.15019 | 0.00096 |
| | | $CD62L^{high}$ | | 0.80340 | 0.66599 | 0.51226 |
| | | $CD62L^{low}$ | % CD28+ | 0.02608 | 0.38471 | 0.04738 |
| | | $CD62L^{high}$ | | 0.29939 | 0.42312 | 0.38577 |
| | | $Cd62L^{low}$ | % CD137+ | 0.36291 | 0.01083 | 0.00857 |
| | | $CD62L^{high}$ | | 0.83206 | 0.57796 | 0.87942 |
| CD8 | | $CD62L^{low}$ | % PD1+ | 0.65841 | 0.00876 | 0.00600 |
| | | $CD62L^{high}$ | | 0.85194 | 0.36441 | 0.74932 |
| | | $CD62L^{low}$ | % CD137+ | 0.05993 | 0.15881 | 0.01833 |
| | | $CD62L^{high}$ | | 0.90533 | 0.50539 | 0.39554 |
| | | $CD62L^{low}$ | % CD28+ | 0.33552 | 0.04048 | 0.19882 |
| | | $CD62L^{high}$ | | 0.58656 | 0.12133 | 0.08773 |
| CD11c+CD141+ | | control | | 0.77469 | 0.02298 | 0.17022 |
| | | HLA-DR+ | | 0.00323 | 0.20542 | 0.00733 |
| | | CD80+ | | 0.75819 | 0.50930 | 0.39338 |
| | | DC | | 0.29056 | 0.71302 | 0.38443 |
| CD33+CD14+ | | HLA-DR+ | | 0.00472 | 0.70358 | 0.00953 |

*X is the ratio of $CD62L^{low}$ cells in CD4+ T cells, and Y is the ratio of CD25+FoxP3+ in CD4+ T cells
1: Before radiation therapy,
2: As of completion of radiation therapy,
3: After radiation therapy

TABLE 3-continued

| | | | |
|---|---|---|---|
| | $CD62L^{high}$ | | 0.31617 |
| | $CD62L^{low}$ | % CD28+ | 0.46535 |
| | $CD62L^{high}$ | | 0.20640 |
| CD11c+CD141+ | control | | 0.42728 |
| | HLA-DR+ | | 0.00031 |
| | CD80+ | | 0.82960 |
| | DC | | 0.05845 |
| CD33+CD14+ | HLA-DR+ | | 0.00026 |

Figure 2:
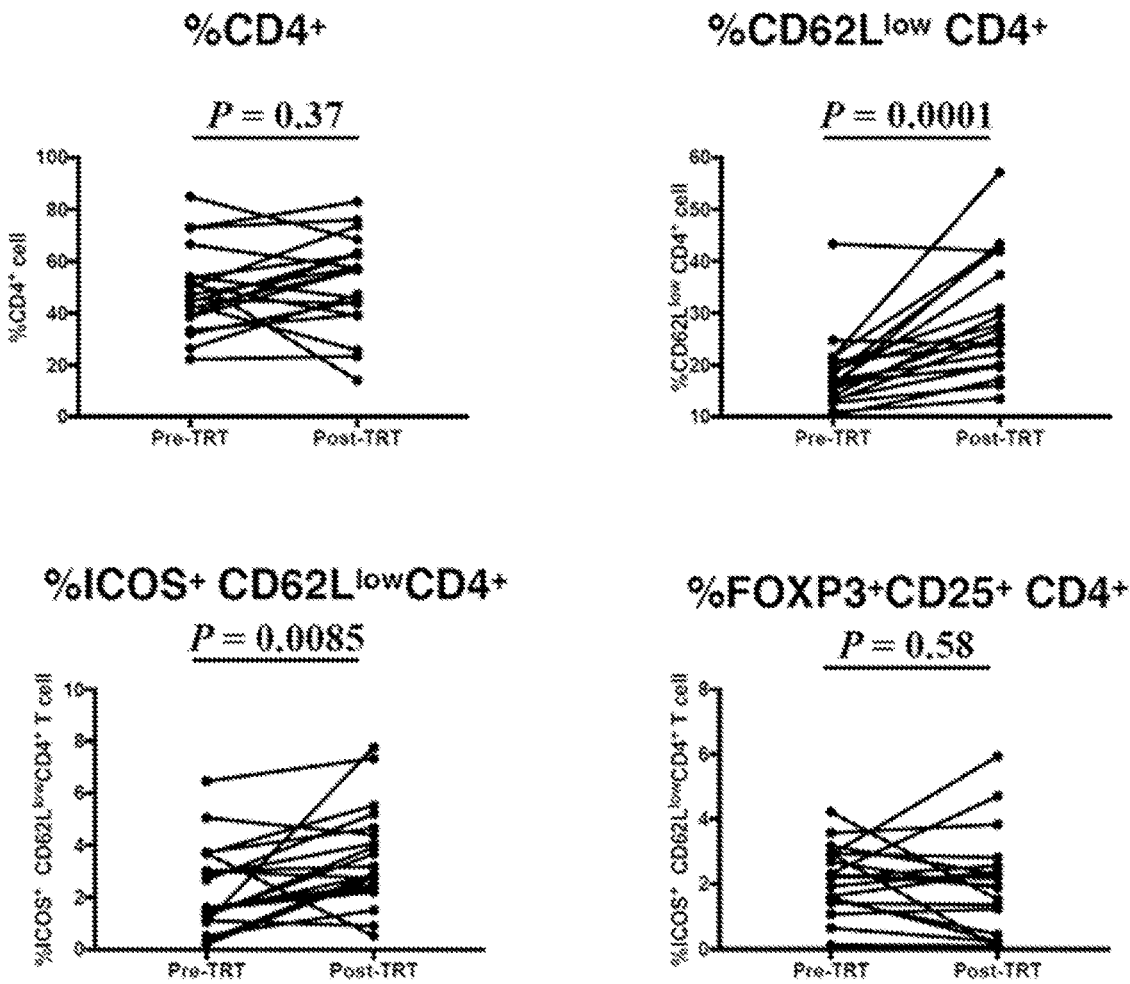
FIG. 2 is a diagram showing the change in peripheral blood CD4+ T cell composition after thoracic radiation therapy relative to before radiation therapy. The top left diagram shows the ratio of a CD4+ T cell subpopulation in a T cell population. The top right diagram shows the ratio of a CD62L$^{low}$CD4+ T cell subpopulation in a CD4+ T cell population. The bottom left diagram shows the ratio of an ICOS+CD62L$^{low}$CD4+ T cell subpopulation in a CD62L$^{low}$CD4+ T cell population. The bottom right diagram shows the ratio of a FOXP3+CD25+CD4+ T cell subpopulation in a CD4+ T cell population. It can be understood that the ratio of the CD62L$^{low}$CD4+ cell subpopulation in the CD4+ cell population and the ratio of the ICOS+CD62L$^{low}$CD4+ cell subpopulation in the CD62L$^{low}$CD4+ cell subpopulation increased significantly.
Figure 5:
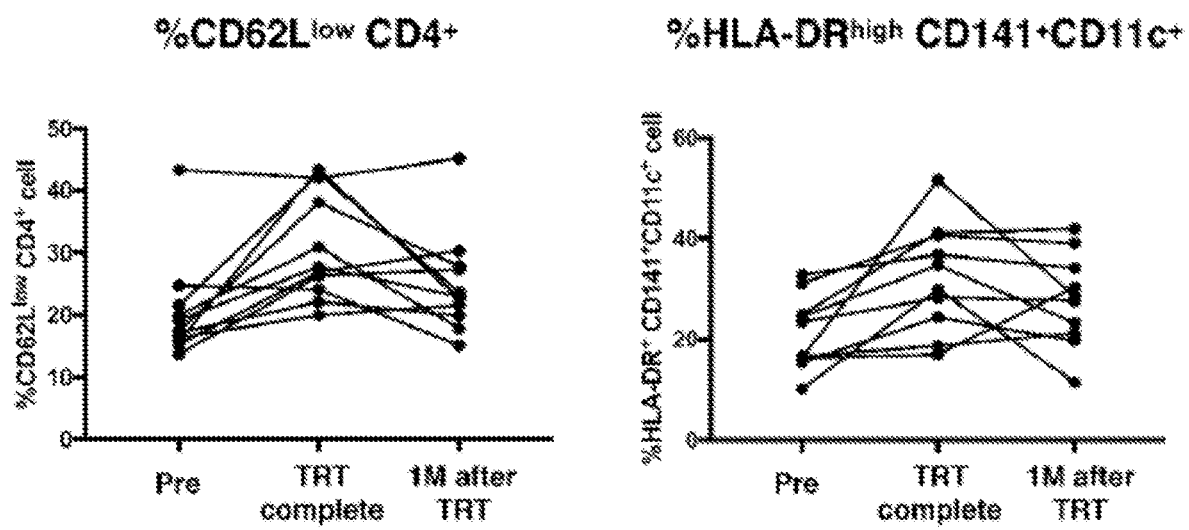
FIG. 5 is a diagram including the changes in the ratio of a CD62L$^{low}$CD4+ cell subpopulation in a CD4+ cell population and the ratio of an HLA-DR+CD141+CD11c+ cell subpopulation in a CD141+CD11c+ cell population within about one month after radiation therapy. The ratio of the CD62L$^{low}$CD4+ cell subpopulation and the ratio of the HLA-DR+CD141+CD11c+ cell subpopulation, which temporarily increased, tended to return to the level before radiation therapy.

*X is the ratio of $CD62L^{low}$ cells in CD4+ T cells, and Y is the ratio of CD25+FoxP3+ in CD4+ T cells X is the ratio of $CD62L^{low}$ cells in CD4+ T cells, and Y is the ratio of CD25+FoxP3+in CD4+ T cells The changes in some cell subpopulations after radiation therapy relative to before radiation therapy are shown in the figures. The ratio of the $CD62L^{low}CD4^+$ cell subpopulation in a CD4+ cell and the ratio of the ICOS+$CD62L^{low}CD4^+$ cell subpopulation in a $CD62L^{low}CD4^+$ cell subpopulation increased significantly after radiation therapy relative to before radiation therapy (FIGS. 1 and 2). An increase in the ratio of the $CD62L^{low}CD4^+$ cell subpopulation in a CD4+ cell population was similarly observed in each type of radiation therapy (curative TRT: curative tho- X is the ratio of $CD62L^{low}$ cells in CD4+ T cells, and Y is the ratio of CD25+FoxP3+ in CD4+ T cells 1: Before radiation therapy, 2: As of completion of radiation therapy, 3: After radiation therapy The changes in some cell subpopulations after radiation therapy relative to before radiation therapy are shown in the figures. At about 30 days after radiation therapy, temporarily increased ratio of the $CD62L^{low}CD4^+$ cell subpopulation and ratio of the HLA-DR+CD141+CD11c+ cell subpopulation tended to revert to the level before radiation therapy (FIG. 5).

(Discussion)

T cell subpopulations that are strongly positively correlated with a $CD62L^{low}CD4^+$ cell subpopulation are type 1 helper CD4+ T cells (Th1), effector memory CD4+ T cells, CD8+CD8+ T cells, and effector cells. They are cell subpopulations that are important for the cell killing function in cell-mediated immunity. Meanwhile, type 2 helper CD4+ T cells (Th2) and regulatory T cells have a negative correlation. These are known as cell subpopulations that suppress cell-mediated immunity. Accordingly, it is understood that an increase in the $CD62L^{low}CD4^+$ cell subpopulation indicates activation of antitumor cell-mediated immunity. The HLA-DR$^+$CD141$^+$CD11c$^+$ dendritic cell subpopulation and CD62L$^{low}$CD4$^+$ cell subpopulation have a positive correlation. This is understood such that expression of an MHC class II restricted antigen by an activated dendritic cell results in an increase in the CD62L$^{low}$CD4$^+$ cell subpopulation which recognizes MHC class II restricted antigens. It is understood that the CD62L$^{low}$CD4$^+$ cell subpopulation is a CD4$^+$ T cell subpopulation correlated with dendritic cell stimulation in tumor immune response. It is understood that the HLA-DR$^+$CD141$^+$CD11c$^+$ dendritic cell subpopulation is a dendritic cell subpopulation correlated with dendritic cell stimulation in an antitumor immune response. It is understood that the LAG3$^+$CD62L$^{low}$CD4$^+$ T cell subpopulation, ICOS$^+$CD62L$^{low}$CD4$^+$ T cell subpopulation, CD28$^+$CD62L$^{low}$CD4$^+$ T cell subpopulation, PD-1$^+$CD62L$^{low}$CD4$^+$ T cell subpopulation, CD137$^+$CD62L$^{low}$CD4$^+$ T cell subpopulation, PD-1$^+$CD62L$^{low}$CD8$^+$ T cell subpopulation, and CD137$^+$CD62L$^{low}$CD8$^+$ T cell subpopulation are T cell subpopulations correlated with dendritic cell stimulation in an antitumor immune response (WO 2018/147291).

A decrease in an HLA-DR$^+$CD141$^+$CD11c$^+$ dendritic cell subpopulation and a decrease in a CD62L$^{low}$CD4$^+$ T cell subpopulation and CD28$^+$CD62L$^{low}$CD4$^+$ T cell subpopulation are found in the results of analyzing a peripheral blood cell fraction at one month after completion of radiation therapy. This can be understood such that elimination of immunogenic cancer cell death from radiation therapy calms down activation of dendritic cells, and CD28 expression required for interaction between a CD62L$^{low}$CD4$^+$ T cell subpopulation and dendritic cells which increased in correlation therewith started decreasing. However, a CD62L$^{low}$CD4$^+$ T cell subpopulation subjected to cancer antigen stimulation from dendritic cells during radiation therapy remains while expressing CD137 and ICOS and maintaining an activated state. Meanwhile, an increase in CD25$^+$Foxp3$^+$CD4$^+$ regulatory T cell subpopulation and CD33$^+$CD14$^+$HLA-DR$^-$ MDSC subpopulation was observed one month after completion of radiation therapy. It is well known that regulatory T cells and MDSCs are cells which suppress T cell immunity. This can be understood as a negative feedback for regulating an activated T cell subpopulation. This shows that a CD62L$^{low}$CD4$^+$ T cell subpopulation is used as a numerator, and a regulatory T cell subpopulation is used as a denominator as an indicator of T cell immune state indicating the effect of PD-1 inhibitor.

The results described above suggest that radiation therapy-induced immune activation can be evaluated using a T cell subpopulation correlated with dendritic cell stimulation in an antitumor immune response and/or dendritic cell subpopulation correlated with dendritic cell stimulation in an antitumor immune response.

Example 2: Application of Radiation Therapy-Induced Immune Activation

An immune checkpoint inhibitor is administered to subjects with a ratio of CD4$^+$CD62L$^{low}$ T cell subpopulation in peripheral blood at or above a certain level. The ratio of CD4$^+$CD62L$^{low}$ T cell subpopulation decreases after administration of an immune checkpoint inhibitor in a responder group in some cases. Responsiveness of a subject to an immune checkpoint inhibitor is monitored by monitoring the ratio of CD4$^+$CD62L$^{low}$ T cell subpopulation in the subject. When the ratio of CD4$^+$CD62L$^{low}$ T cell subpopulation decreases, radiation therapy is administered to a subject. The ratio of CD4$^+$CD62L$^{low}$ T cell subpopulation increases and responsiveness of a subject to an immune checkpoint inhibitor recovers by radiation therapy.

Radiation therapy is administered to a subject who has been determined to have a ratio of CD62L$^{low}$CD4$^+$ T cell subpopulation in peripheral blood of less than the non-responder group threshold value and to be unresponsive to cancer immunotherapy by the procedure described in WO 2018/147291. An immune checkpoint inhibitor is administered to the subject thereafter. The ratio of CD62L$^{low}$CD4$^+$ T cell subpopulation in peripheral blood of the subject increases, becoming responsive to an immune checkpoint inhibitor, by radiation therapy.

Example 3: Correlation Between CD62L$^{low}$CD4$^+$ T Cells and Effector Memory Cells 84 specimens obtained from 42 stage I to IV lung cancer patients (from 20 patients before and after surgery and from 22 patients before and after EGFR-TKI) were analyzed by Fortessa to analyze the relationship between the ratio of CD62L$^{low}$CD4$^+$ T cells in CD4$^+$ T cells and the ratio of effector memory cell (CCR7$^-$CD45RA$^-$) CD4$^+$ T cells in CD4$^+$ T cells.

Figure 6:
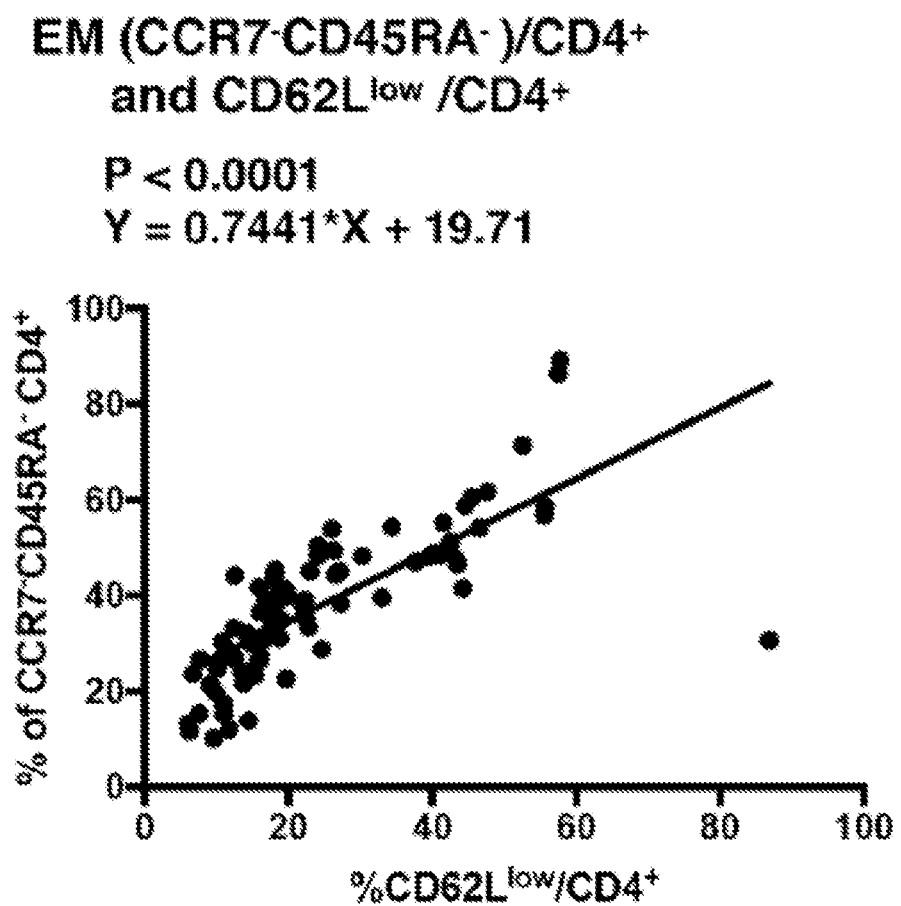
FIG. 6 is a diagram showing the relationship between the ratio of CD62L$^{low}$CD4+ T cells in CD4+ T cells and the ratio of effector memory cell (CCR7−CD45RA−) CD4+ T cells in CD4+ T cells. It is understood that the amount of these cell subpopulations have a strong correlation.

The results are shown in FIG. 6. It can be understood that CD62L$^{low}$CD4$^+$ T cells and CCR7$^-$CD45RA$^-$CD4$^+$ T cells are strongly correlated. The results suggest that the amount of effector memory cell (CCR7$^-$CD45RA$^-$) CD4$^+$ T cells can be used as a substitute for the amount of CD62L$^{low}$CD4$^+$ T cells.

Example 4: Study on Indicator of Radiation Therapy-Induced Immune Activation for Different Patient Populations (Summary)

In addition to the study in Example 1, this Example studied whether the composition of a specific cell subpopulation in different patient populations is a parameter (i.e., biomarker) that significantly changes in a subject after radiation therapy relative to before radiation therapy.

(Materials and Methods)

[Subject]

This Example was conducted at the Saitama Medical University International Medical Center on 56 continuous locally advanced NSCLC patients who have undergone curative chemoradiotherapy (CRT) or thoracic radiation therapy. 22 patients underwent combination therapy with durvalumab after CRT. Peripheral blood samples were collected before and after radiation therapy and in some cases about one month after radiation therapy. PBMCs were analyzed by LSR Fortessa™. Sampling at each point in time was performed in accordance with the same procedure as Example 1.

The details of target patients and treatment administered were the following.

TABLE 5

| Patient characteristics | |
|---|---|
| | N = 56 |
| Age | |
| Median years (range) | 71 (51-83) |
| Sex | |
| Male/Female | 42/14 |

TABLE 5-continued

Patient characteristics

| | N = 56 |
|---|---|
| ECOG PS | |
| 0/1/2 | 36/18/2 |
| Smoking history | |
| Yes/No | 50/6 |
| Tissue type | |
| Adeno/SQ/NOS | 26/18/12 |
| Clinical Stage | |
| IIIA/IIIB/IIIC/others | 24/21/2/9 |
| Gene Mutation | |
| EGFR/ALK/ROS-1/none | 4/1/0/51 |

TABLE 6

Details of treatment

| Combination Chemotherapy (N = 56) | |
|---|---|
| Yes/No | 43/13 |
| Radiation dose(N = 56) | |
| 60Gy/30Fr | 49(87.5%) |
| 66Gy/30Fr | 5(8.9%) |
| 54Gy/27Fr | 1(1.8%) |
| 50Gy/25Fr | 1(1.8%) |
| Chemotherapy regimen(N = 43) | |
| weekly CBDCA/PTX | 19(44.29%) |
| daily CBDCA | 15(34.9%) |
| CDDP/DTX | 4(9.3%) |
| CDDP + TS-1 | 4(8.3%) |
| biweekly CBDCA/DTX | 1(2.3%) |
| Durvalumab(N = 56) | |
| Yes/No | 22/34 |

(Results)

The results are shown in FIGS. 7 to 11. "before RT" in FIGS. 7 to 11 corresponds to "pre-TRT" in FIGS. 1 to 6, which indicates immediately before radiation therapy (RT). "post-RT" in FIGS. 7 to 11, and "post-TRT", "at TRT completion", and "TRT complete" in FIGS. 1 to 6 are all immediately after completion of radiation therapy (RT).

A significant increase was observed in the ratios of $CD62L^{low}CD4^+$ T cells and $HLA-DR^+$ myeloid dendritic cells in peripheral blood after thoracic radiation therapy, which is consistent with the results in Example 1 (FIGS. 7a and 7b). A significant correlation was observed between progression free survival (PFS) and % $CD62L^{low}CD4^+$ T cells before radiation therapy (FIG. 7c). The $HLA-DR^{high}CD11c^+CD123^-$ mDC in FIG. 7 is a cell population corresponding to $HLA-DR^{high}CD11c^+CD141^+mDC$ in FIG. 5 and Tables 3 and 4 in Example 1.

FIG. 8 is a diagram showing the change in expression of immune checkpoint molecules on $CD62L^{low}CD4^+$ T cells as of completion of radiation therapy relative to before radiation therapy (paired t-test). Expression of LAG-3 and ICOS on $CD62L^{low}CD4^+$ T cells increased significantly, which is consistent with the result (Table 3) in Example 1 (FIGS. 8b and 8c). In addition, a significant difference was also observed in the increase in PD-1 expression on $CD62L^{low}CD4^+$ T cells in this Example (FIG. 8a). It is understood to be due to an increase in the sample size.

Figure 9:
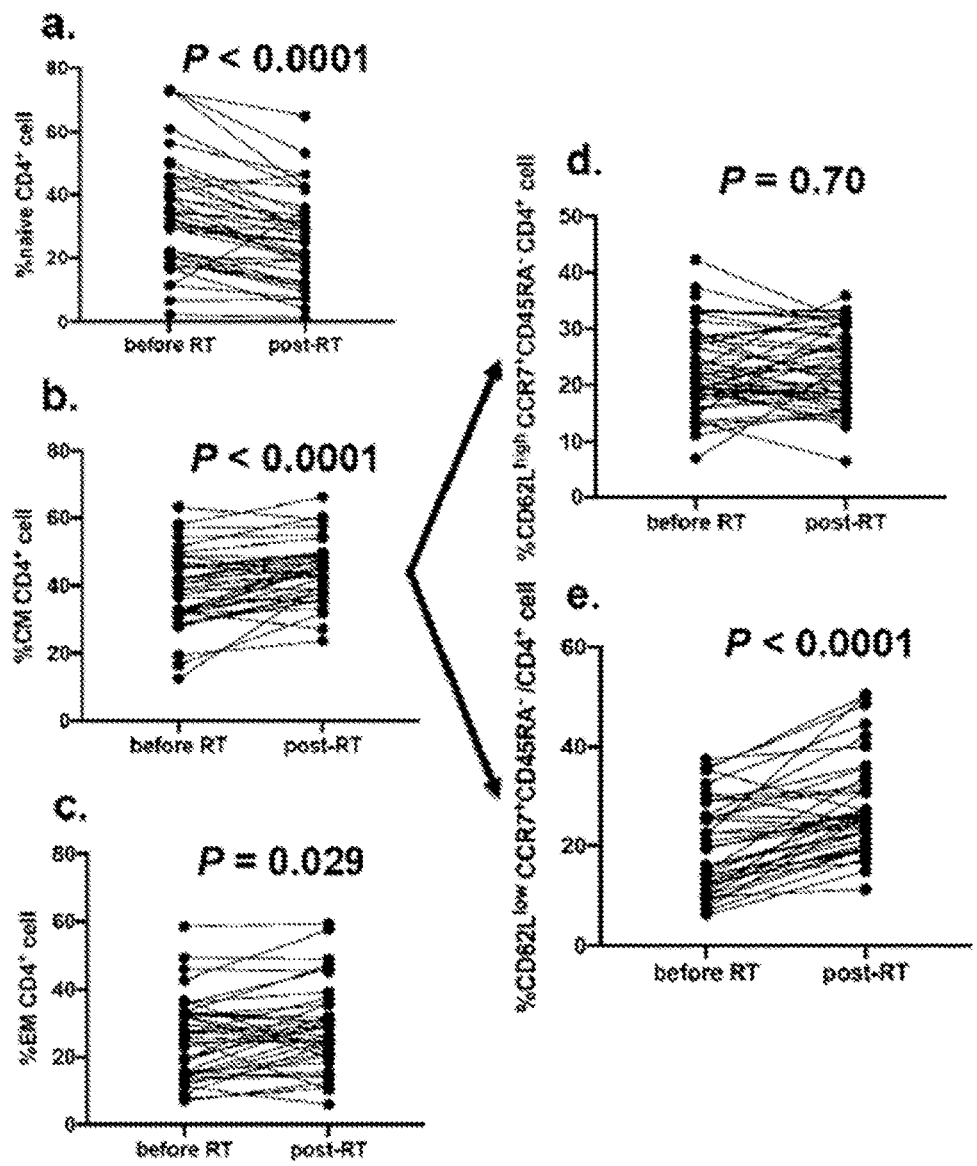
FIG. 9 is a diagram showing the change in a T cell subpopulation based on CCR7 and CD45RA gated CD4+ T cells as of completion of radiation therapy relative to before radiation therapy. naive: CCR7+CD45RA+, CM: CCR7+CD45RA−, EM: CCR7−CD45RA− (paired t-test).

FIG. 9 is a diagram showing the change in a T cell subpopulation based on CCR7 and CD45RA gated $CD4^+$ T cells before radiation therapy relative to as of completion of radiation therapy. CCR7 and CD45RA are generally cell surface markers that can be used for fractionating naïve T cells ($CCR7^+CD45RA^+$), central memory (CM) T cells ($CCR7^+CD45RA^-$), and effector memory T cells ($CCR7^-CD45RA^-$).

It was found that naïve CD4 cells decrease after radiation therapy relative to before radiation therapy, as shown in FIG. 9a. As shown in FIG. 9b, a significant increase in central memory cells (CM), i.e., $CCR7^+CD45RA^-CD4^+$ T cells, was observed. Since central memory cells correspond to cells that are, after once functioning, dormant and having no target of attack, an increase in central memory cells after radiation therapy is inconsistent with the logic of the present invention. In this regard, a study was conducted by actually separating a group of central memory cells further into $CD62L^{low}$ and $CD62L^{high}$. It was found that a cell population of $CD62L^{low}$, which is a feature of effector memory cells (EM), was increased instead of a cell population of $CD62L^{high}$, which is a feature of cell surface marker of normal central memory cells (FIGS. 9d and 9e). Specifically, the population of $CD62L^{low}CCR7^+$ (FIG. 9e) outwardly appeared to be CM because CCR7 was transiently expressed. The cell population that actually increased was EM. It is understood that EM increases due to radiation therapy in view of FIGS. 9c and 9e. This result is consistent with Example 3.

Figure 10:
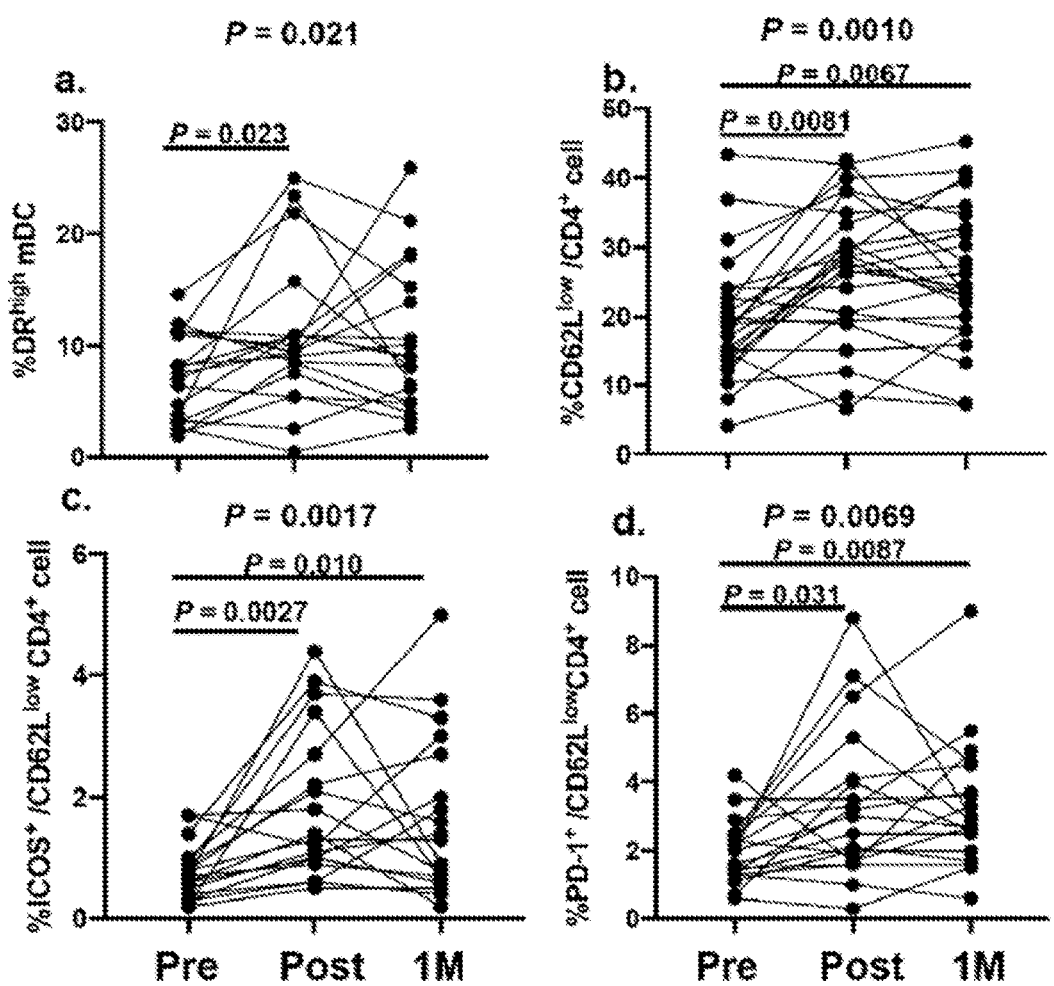
FIG. 10 is a diagram showing the kinetics in % mDC, % CD62L$^{low}$CD4+ T cell, and immune checkpoint molecule expression before radiation therapy, as of completion of radiation therapy, and within about one month after radiation therapy (one-way ANOVA with Tukey post-hoc test).

FIG. 10 is a diagram showing the kinetics in % mDC, % $CD62L^{low}CD4^+$ T cell, and immune checkpoint molecule expression before radiation therapy, as of completion of radiation therapy, and within about one month after radiation therapy (one-way ANOVA with Tukey post-hoc test). The p-value at the very top of each diagram is the result of ANOVA. The p-value between two points found to have a significant difference by post-hoc analysis is shown with a bar. $CD62L^{low}CD4^+$ T cells started to decrease by 4 weeks after radiation n therapy in half of the patients. While a statistically significant difference was not found between as of completion of radiation therapy and about one month after radiation therapy, such T cells decreased over time in about half of the patients. Much like the results of Table 4 in Example 1, ICOS and PD-1 expression in mDCs, $CD62L^{low}CD4^+$ T cells, and $CD62L^{low}CD4^+$ T cells that increased after radiation therapy have a tendency to decrease in one month thereafter. This indicates that the immune function against tumor that has been once activated would subsequently decrease. It is understood that it is better to start administering an immune checkpoint inhibitor or the like before these cells decrease. FIGS. 10a-10d show the change in % $DR^{high}mDC$ cell (10a), % $CD62L^{low}/CD4^+$ cell (10b), % $ICOS^+/CD62L^{low}CD4^+$ cell (10c), and % $PD-1^+/CD62L^{low}CD4^+$ cell (10d), respectively.

FIG. 11 is a diagram showing the change in T cell subpopulation based on CCR7 and CD45RA gated $CD8^+$ T cells as of completion of radiation therapy relative to before radiation therapy. FIGS. 11a-11d show the change in % EMRA $CD8^+$ cell (11a), % naive $CD8^+$ cell (11b), % EM $CD8^+$ cell (11c), and % CM $CD8^+$ cell (11d), respectively.

While FIG. 1 shows that there is no significant change in the amount of $CD8^+$ cell population after radiation therapy relative to before radiation therapy, it is understood that cells which actually have the ability to kill cancer cells are $CD8^+$ cells. Thus, the presence of a change in a specific subpopulation in a $CD8^+$ T cell population from radiation therapy was analyzed with CCR7 and CD45RA gating. As described above, CCR7 and CD45RA are generally cell surface markers that can be used in fractionating naïve T cells (CCR7$^+$CD45RA$^+$), central memory (CM) T cells (CCR7$^+$CD45RA$^-$), and effector memory T cells (CCR7$^-$CD45RA$^-$), and CCR7$^-$CD45RA$^+$ cells correspond to senescent EM cells (terminally differentiated) (EMRA).

An increase in EM (FIG. 11c) and CM (FIG. 11d) and a decrease in EMRA (FIG. 11a) indicate an increase in young EM and a decrease in senescent EM. It is understood from these results that CD8 positive cells are also activated by RT.

(Discussion)

Upon radiation therapy, immunity is activated by radiation therapy, resulting in a state where immune checkpoint inhibition is more effective. With passage of time, this state reverts back to the original state. In an immunity activated state, cells that differentiate into a specific cell population (CD62L$^{low}$CD4$^+$, etc.) increase, undifferentiated (naïve) cells decrease, stimulated or activated dendritic cells (HLA-DR$^{high}$CD11c$^+$CD123$^-$ mDC etc.) increase, and young EM in a CD8 positive cell population increases. It can be determined whether immune checkpoint inhibition is more effective after radiation therapy by looking at a change in one of these cell populations. In addition, a state where such inhibition is more effective naturally reverts back to the original state with passage of time. Thus, it can be determined whether it is necessary to induce a state where immune checkpoint inhibition is more effective again by re-administering radiation therapy.

When analyzed with only chemotherapy instead of radiation therapy (n=60, data not shown), the ratios of both CD4 and CD8 positive effector memory cells (CCR7$^-$CD45RA$^-$) decreased significantly. The CCR7$^-$CD45RA$^+$CD8$^+$ (EMRA) cell fraction increased slightly, albeit without a significant difference. Although a change in the ratio of CD62L$^{low}$ was not found, a slight decreasing trend was observed. There was no change in dendritic cells. In view of the above, there is a tendency to change with an opposite pattern in a T cell fraction compared to after radiation therapy with only chemotherapy (with only an anticancer agent therapy, it appears that young EM decreased and old effector EMRA fraction increased as a percentage).

When analyzed in a patient group with only radiation therapy, the same result is reached as a chemoradiotherapy (chemotherapy+radiation therapy) group. Thus, it is understood that the change in immune cell composition after radiation therapy relative to before radiation therapy in this Example is due to radiation therapy.

The following mechanisms are envisioned as the interpretation of the results in this Example:

Radiation therapy results in local immunogenic cell death due to radiation, activation of dendritic cells, and proliferation of effector T cells;

Anticancer therapy using a chemotherapeutic agent results in immunogenic cancer cell death due to the chemotherapeutic agent and activation of dendritic cells, but at the same time results in an effect of decreasing dendritic cells due to the chemotherapeutic agent and steroid as an antiemetic. Even if effector T cells proliferate due to dendritic cell activation, T cells in a cell cycle are damaged and killed by the chemotherapeutic agent (EM fraction decreasing effect). An EMRA population that has already lost the ability to proliferate, even when presented with an antigen, does not enter a cell cycle and is not damaged, and is subjected to an effect of extending survival due to antigen stimulation (effect of temporary increase in EMRA fraction).

Thus, with repeated chemotherapeutic agent therapy, it is expected that terminally differentiated effector cells EMRA are ultimately depleted and antitumor T cell immunity would be lost due to the effect of decreasing young EM. For example, Keynote062, which is a clinical trial for gastric cancer, shows that the therapeutic effect of a long-term treatment concomitantly using an anti-PD-1 antibody and a chemotherapeutic agent is less than the therapeutic effect from the anti-PD-1 antibody alone. Meanwhile, it is understood that radiation therapy can boost antitumor T cell immunity by an effect of increasing young EM. It is understood that such a boosting effect can be quantified by observing one of the cell populations (e.g., mDC, CD62L$^{low}$ T cell fraction, etc.) associated with the mechanism described above.

INDUSTRIAL APPLICABILITY

The present invention can be utilized in cancer therapy. The present invention can evaluate radiation therapy-induced immune activation. This can be used in cancer immunotherapy (e.g., immune checkpoint inhibitor) used concomitantly with radiation therapy.

(Notes)

As disclosed above, the present invention is exemplified by the use of its preferred embodiments. However, the present invention should not be interpreted to be limited to such embodiments. It is understood that the scope of the present invention should be interpreted based solely on the Claims. It is understood that an equivalent scope can be practiced by those skilled in the art based on the descriptions of the present invention and common general knowledge from the specific descriptions in the preferred embodiments of the present invention. It is also understood that any patent, any patent application, and any references cited herein should be incorporated herein by reference in the same manner as the contents are specifically described herein. The present application claims priority to Japanese Patent Application No. 2019-028502 (filed on Feb. 20, 2019) and Japanese Patent Application No. 2019-175852 (filed on Sep. 26, 2019) with the Japan Patent Office. The entire content thereof is incorporated herein by reference.

The invention claimed is:

1. A method of using a composition of a cell subpopulation in a sample obtained from a subject who has undergone radiation therapy as an indicator of radiation therapy-induced immune activation in the subject, comprising:

analyzing the composition of the cell subpopulation in the sample obtained from the subject;

wherein the presence/absence of immune activation in the subject is indicated by comparing an amount of a CD4$^+$ T cell subpopulation correlated with dendritic cell stimulation in an antitumor immune response in the sample with a baseline, and the CD4$^+$ T cell subpopulation correlated with dendritic cell stimulation in an antitumor immune response is a cell subpopulation within a CD62L$^{low}$CD4$^+$ T cell population, wherein an increase in the amount of the cell subpopulation in the sample relative to the baseline indicates that immunity is activated by radiation therapy in the subject, wherein no increase in the amount of the cell subpopulation in the sample relative to the baseline indicates that immunity is not activated by radiation therapy in the subject, wherein radiation therapy-induced immune activation in the subject further indicates that cancer immunotherapy comprising one or more immune checkpoint inhibitors should be administered to the subject at that point in time,
wherein the one or more immune checkpoint inhibitors comprise a PD-1 inhibitor, a PD-L1 inhibitor, and/or a CTLA-4 inhibitor, and
wherein no radiation therapy-induced immune activation in the subject further indicates that radiation therapy should be re-administered to the subject.

2. The method of claim 1, wherein the presence/absence of immune activation in the subject is further indicated by comparing an amount selected from the group consisting of an amount of a dendritic cell subpopulation correlated with dendritic cell stimulation in an antitumor immune response and an amount of a CD8$^+$ T cell subpopulation correlated with dendritic cell stimulation in an antitumor immune response in the sample with a baseline.

3. The method of claim 2, wherein the dendritic cell subpopulation correlated with dendritic cell stimulation in an antitumor immune response is an HLA-DR$^+$CD141$^+$CD11c$^+$ cell subpopulation.

4. The method of claim 2, wherein the CD8$^+$ T cell subpopulation correlated with dendritic cell stimulation in an antitumor immune response is a cell subpopulation within a CD62L$^{low}$CD8$^+$ T cell population.

5. The method of claim 4, wherein the CD8$^+$ T cell subpopulation correlated with dendritic cell stimulation in an antitumor immune response is a CD137$^+$CD62L$^{low}$CD8$^+$ T cell subpopulation.

6. The method of claim 1, wherein the CD4$^+$ T cell subpopulation correlated with dendritic cell stimulation in an antitumor immune response is an ICOS$^+$CD62L$^{low}$CD4$^+$ T cell subpopulation, a LAG3$^+$CD62L$^{low}$CD4$^+$ T cell subpopulation, a PD-1$^+$CD62L$^{low}$CD4$^+$ T cell subpopulation, or a CD28 CD62L$^{low}$CD4$^+$ T cell subpopulation.

7. The method of claim 1, wherein the sample is a peripheral blood sample.

8. The method of claim 1, wherein the baseline is an amount of the cell subpopulation in a sample of the subject prior to the radiation therapy.

9. The method of claim 1, wherein the radiation therapy is administered within an irradiation range including tumor.

10. The method of claim 1, further characterized by using a composition of a cell subpopulation in a sample obtained at a plurality of points in time from a subject as an indicator for monitoring radiation therapy-induced immune activation in the subject, the method comprising analyzing the composition of the cell subpopulation in the sample obtained at the plurality of points in time from the subject.

11. A method for treating cancer in a subject, comprising:
(1) identifying a subject who has immunity activated in the subject by the method of claim 1; and
(2) administering one or more immune checkpoint inhibitors to the subject identified in (1).

12. The method of claim 11, wherein the one or more immune checkpoint inhibitors is a PD-1 inhibitor, a PD-L1 inhibitor, and/or a CTLA-4 inhibitor.

13. The method of claim 12, further comprising co-administering one or more additional agents.

14. The method of claim 13, wherein the additional agents comprise an additional immune checkpoint inhibitor.

15. The method of claim 11, wherein the subject identified in (1) had an immune cell composition which was not responsive to cancer immunotherapy before undergoing radiation therapy.

16. The composition of claim 15, wherein the immune cell composition which was not responsive to cancer immunotherapy is a composition of cells having an amount or ratio of a CD62L$^{low}$CD4$^+$ T cell subpopulation lower than a threshold value.

17. The method of claim 1, wherein the method further comprises analyzing the composition of the cell subpopulation in the sample obtained from the subject who has undergone the re-administered radiation therapy.

18. The method of claim 1, wherein the one or more immune checkpoint inhibitors comprise:
(i) a PD-1 inhibitor,
(ii) a PD-L1 inhibitor,
(iii) a combination of a PD-1 inhibitor and a CTLA-4 inhibitor; or
(iv) a combination of a PD-L1 inhibitor and a CTLA-4 inhibitor.

* * * * *